US012651568B2

(12) United States Patent
Baek et al.

(10) Patent No.: US 12,651,568 B2
(45) Date of Patent: Jun. 9, 2026

(54) IMAGE DISPLAY APPARATUS CAPABLE OF STABLY DISPLAYING IMAGES IN VARIOUS MODES

(71) Applicant: LG ELECTRONICS INC., Seoul (KR)

(72) Inventors: Dongchul Baek, Seoul (KR); Dohoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 18/664,768

(22) Filed: May 15, 2024

(65) Prior Publication Data

US 2024/0412686 A1　Dec. 12, 2024

(30) Foreign Application Priority Data

Jun. 8, 2023　(KR) ........................ 10-2023-0073395

(51) Int. Cl.
*G09G 3/3233*　(2016.01)
*G09G 3/32*　(2016.01)
*H02M 1/32*　(2007.01)
*H02M 3/158*　(2006.01)

(52) U.S. Cl.
CPC ............. *G09G 3/3233* (2013.01); *G09G 3/32* (2013.01); *H02M 1/32* (2013.01); *H02M 3/158* (2013.01); *G09G 2330/021* (2013.01); *G09G 2330/045* (2013.01)

(58) Field of Classification Search
CPC .. G09G 3/3233; G09G 3/32; G09G 2330/045; H02M 1/32; H02M 3/158
See application file for complete search history.

(56) References Cited

U.S. PATENT DOCUMENTS

| | | | | |
|---|---|---|---|---|
| 8,294,641 B2 * | 10/2012 | Johnson | ............... | G09G 3/3233 |
| | | | | 345/589 |
| 10,460,657 B2 * | 10/2019 | Nakatani | .............. | G09G 3/3266 |
| 10,715,775 B2 * | 7/2020 | Kim | .......................... | G06T 5/92 |
| 11,322,077 B1 * | 5/2022 | Chun | ................... | G09G 3/3208 |
| 11,336,845 B2 * | 5/2022 | Choi | .................... | H04N 25/589 |
| 11,533,534 B2 * | 12/2022 | Huang | ............. | H04N 21/43635 |

(Continued)

FOREIGN PATENT DOCUMENTS

| | | |
|---|---|---|
| KR | 10-2008-0015978 A | 2/2008 |
| KR | 10-2017-0069491 A | 6/2017 |

(Continued)

OTHER PUBLICATIONS

Michael Desjardin, What is Eco mode for TVs and should you use it, 2022, reviewed.com.*

(Continued)

*Primary Examiner* — Sejoon Ahn
(74) *Attorney, Agent, or Firm* — Birch, Stewart, Kolasch & Birch, LLP

(57) ABSTRACT

An image display apparatus including a display; a signal processing device to output an image signal to the display; and a power supply to output a display driving voltage of a first level based on a first mode, output a display driving voltage of a second level higher than the first level based on a second mode, and output a display driving voltage of a third level higher than the second level based on a third mode.

16 Claims, 17 Drawing Sheets

(56) References Cited

U.S. PATENT DOCUMENTS

| | | | | |
|---|---|---|---|---|
| 2003/0117698 A1* | 6/2003 | Williams | H03G 3/3084 | |
| | | | | 359/341.41 |
| 2005/0110810 A1* | 5/2005 | Lee | G09G 5/003 | |
| | | | | 345/690 |
| 2007/0040516 A1* | 2/2007 | Chen | H05B 39/045 | |
| | | | | 315/291 |
| 2009/0027929 A1* | 1/2009 | Kim | H02J 9/005 | |
| | | | | 363/65 |
| 2009/0051674 A1* | 2/2009 | Kimura | G09G 3/3291 | |
| | | | | 345/204 |
| 2013/0176295 A1* | 7/2013 | Jung | G09G 3/3648 | |
| | | | | 345/212 |
| 2013/0335043 A1* | 12/2013 | He | H02M 3/08 | |
| | | | | 323/234 |
| 2015/0179098 A1* | 6/2015 | Kuang | H05B 45/00 | |
| | | | | 345/211 |
| 2017/0085183 A1* | 3/2017 | Notsch | H02M 1/44 | |
| 2017/0221413 A1* | 8/2017 | Hoffman | G09G 3/36 | |
| 2017/0302858 A1* | 10/2017 | Porter | H04N 23/72 | |
| 2018/0338104 A1* | 11/2018 | Pines | H04N 21/44 | |
| 2020/0007044 A1* | 1/2020 | Sato | H02M 1/36 | |
| 2020/0013371 A1* | 1/2020 | Yang | G09G 5/02 | |
| 2020/0175906 A1* | 6/2020 | Lee | G09G 3/20 | |
| 2021/0027435 A1* | 1/2021 | Tao | G09G 5/14 | |
| 2021/0043132 A1* | 2/2021 | Nam | G09G 3/32 | |
| 2021/0056906 A1* | 2/2021 | Lee | H10K 59/60 | |
| 2021/0175802 A1* | 6/2021 | Chan | H02M 1/0048 | |
| 2021/0193041 A1* | 6/2021 | Xu | G09G 3/3258 | |
| 2021/0327350 A1* | 10/2021 | Nam | G09G 3/2025 | |
| 2022/0254309 A1* | 8/2022 | Park | G09G 3/20 | |
| 2022/0264190 A1* | 8/2022 | Atkins | H04N 21/4854 | |
| 2022/0351689 A1* | 11/2022 | Kim | G09G 3/3258 | |
| 2023/0253885 A1* | 8/2023 | Nymand | H02M 3/33573 | |
| | | | | 363/47 |
| 2023/0369988 A1* | 11/2023 | Bando | H02M 1/32 | |
| 2024/0097576 A1* | 3/2024 | Shimizu | H02M 5/458 | |
| 2024/0404464 A1* | 12/2024 | Yang | G09G 3/2007 | |

FOREIGN PATENT DOCUMENTS

| | | |
|---|---|---|
| KR | 10-2022-0067706 A | 5/2022 |
| KR | 10-2022-0073413 A | 6/2022 |

OTHER PUBLICATIONS

Mark Knapp, what's the real cost of power-hungry gaming monitors?, 2023, reviewed.com.*
LG, Specifications of LG 27UP650-W, 2022, monitorsfaq.com.*

* cited by examiner (c)

(b)

(a)

IMAGE DISPLAY APPARATUS CAPABLE OF STABLY DISPLAYING IMAGES IN VARIOUS MODES

CROSS-REFERENCE TO RELATED APPLICATION

This application claims priority to Korean Patent Application No. 10-2023-0073395, filed in the Republic of Korea on Jun. 8, 2023, the entire contents of which is hereby expressly incorporated by reference into the present application.

BACKGROUND

1. Field

The present disclosure relates to an image display apparatus, and more particularly, to an image display apparatus capable of stably displaying images in various modes.

2. Description of the Related Art

An image display apparatus displays images. Recently, in keeping with the increase in image resolution and the increase in image sharpness, the display resolution or peak luminance of a display in an image display apparatus is increasing.

In addition, as the display resolution or peak luminance of a display becomes higher, the consumption of power supplied to the display becomes higher. In particular, even with an increase in the peak luminance of the display, if a display driving voltage supplied to the display is constant, reliability issues arise such as an increase in heat generated in circuit elements.

SUMMARY

Accordingly, an object of the present disclosure is to provide an image display apparatus capable of reducing heat generation by supplying various display driving voltages in various modes.

Another object of the present disclosure is to provide an image display apparatus capable of stably displaying images in various modes.

In accordance with the present disclosure, the above and other objects may be accomplished by the provision of an image display apparatus including a display; a signal processing device to output an image signal to the display; and a power supply to supply a display driving voltage to the display, wherein the power supply outputs a display driving voltage of a first level based on a first mode, outputs a display driving voltage of a second level higher than the first level based on a second mode, and outputs a display driving voltage of a third level higher than the second level based on a third mode.

The power supply may include a converter to convert an input voltage to output a DC voltage, wherein the converter includes a transformer; and a multi-level voltage output circuit connected to an output terminal of the transformer, and configured to output one of the display driving voltages of the first to third levels based on one of the first to third modes.

The multi-level voltage output circuit may include: a first resistor element and a second resistor element disposed at the output terminal of the transformer and connected in series to each other; a third resistor element and a first switching element disposed at a first leg connected in parallel to both ends of the second resistor element, and connected in series to each other; and a fourth resistor element and a second switching element disposed at a second leg connected in parallel to both ends of the second resistor element, and connected in series to each other.

One of the display driving voltages of the first to third levels is outputted, based on the turn-on or turn-off of the first switching element or the second switching element.

The converter may further include: a third switching element and a fourth switching element disposed at an input terminal of the transformer and connected in series to each other; a voltage detector to detect a display driving voltage outputted from the output terminal of the transformer; and a switching controller to control the third switching element or the first switching element, based on a voltage detected by the voltage detector.

The voltage detector may detect the voltage at both ends of the second resistor element, and the switching controller may be configured to increase the voltage at the output terminal of the transformer as the voltage at both ends of the second resistor element becomes lower.

The power supply may further include a resonance capacitor and a resonance inductor each connected between the input terminal of the transformer and the fourth switching element.

The voltage detector may include: a regulator electrically connected to one end of the second resistor element; and a photo coupler electrically connected to the regulator, for transmitting the voltage between both ends of the second resistor element to the switching controller.

In response to the voltage detected by the voltage detector being lower than a first reference voltage corresponding to the first mode, the switching controller may control the third switching element or the fourth switching element for the voltage detected by the voltage detector to reach the first reference voltage.

In response to the voltage detected by the voltage detector being lower than a second reference voltage corresponding to the second mode, the switching controller may control the third switching element or the fourth switching element for the voltage detected by the voltage detector to reach the second reference voltage.

In response to the voltage detected by the voltage detector being lower than a third reference voltage corresponding to the third mode, the switching controller may control the third switching element or the fourth switching element for the voltage detected by the voltage detector to reach the third reference voltage.

Both the first switching element and the second switching element may be turned off in the first mode, one of the first switching element and the second switching element may be turned on in the second mode, and both the first switching element and the second switching element may be turned on in the third mode.

The signal processing device may be configured to output a display driving voltage for a selected mode among the first to third modes displayed in a settings screen.

In response to display power control-on mode being selected in the settings screen, the signal processing device may be configured to control the power supply to supply the display driving voltage of the first level to the display based on the first mode, and in response to display power control-off mode being selected in the settings screen, the signal processing device may be configured to control the power supply to supply the display driving voltage of the second level to the display based on the second mode.

In response to peak-on mode being selected in the settings screen, the signal processing device may be configured to control the power supply to supply the display driving voltage of the third level to the display based on the third mode.

In response to the image output mode of the signal processing device being Eco mode or Standard mode, the power supply may output the display driving voltage of the first level, and in response to the image output mode of the signal processing device being Cinema mode or Game mode, the power supply may output the display driving voltage of the second level.

In response to the image output mode of the signal processing device being High Dynamic Range mode, the power supply may output the display driving voltage of the third level.

The difference between the third level and the second level may be greater than the difference between the second level and the first level.

In accordance with an aspect of the present disclosure, the above and other objects may be accomplished by the provision of an image display apparatus comprising: a display; a signal processing device to output an image signal to the display; and a power supply to supply a display driving voltage to the display, wherein the power supply changes the display driving voltage, based on an image output mode of the signal processing device, outputs a higher-level display driving voltage in Cinema mode or Game mode than in response to the image output mode of the signal processing device being Eco mode, and outputs a higher-level display driving voltage in Cinema mode or Game mode than in response to the image output mode of the signal processing device being High Dynamic Range mode.

The power supply may include: a transformer: a first resistor element and a second resistor element disposed at the output terminal of the transformer and connected in series to each other; a third resistor element and a first switching element disposed at a first leg connected in parallel to both ends of the second resistor element, and connected in series to each other; and a fourth resistor element and a second switching element disposed at a second leg connected in parallel to both ends of the second resistor element, and connected in series to each other, wherein one of the display driving voltages of the first to third levels is outputted, based on the turn-on or turn-off of the first switching element or the second switching element.

The power supply may further include: a third switching element and a fourth switching element disposed at an input terminal of the transformer and connected in series to each other; a voltage detector to detect a display driving voltage outputted from the output terminal of the transformer; and a switching controller to control the third switching element or the first switching element, based on a voltage detected by the voltage detector.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Hereinafter, the present disclosure will be described in detail with reference to the accompanying drawings.

Regarding constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
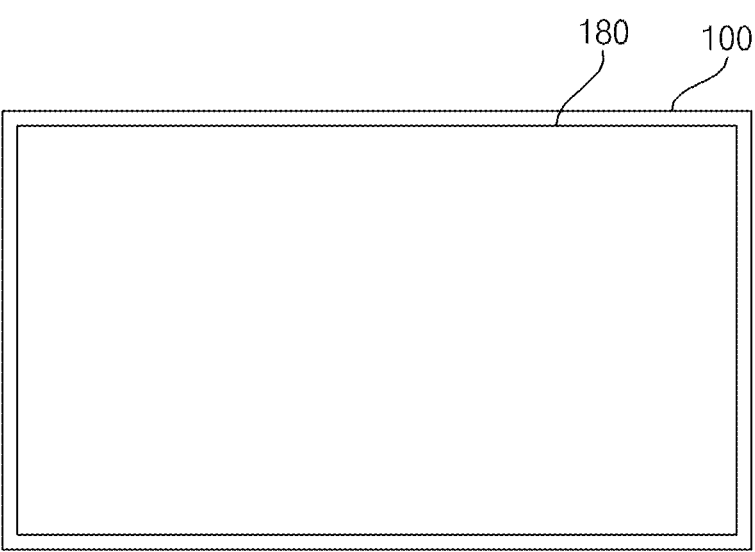
FIG. 1 is a diagram showing an image display apparatus according to an embodiment of the present disclosure.

FIG. 1 is a diagram showing an image display apparatus 100 according to an embodiment of the present disclosure. As shown, the image display apparatus 100 includes a display 180.

In addition, the display resolution of the display 180 is increasing from 2K to 4K to 8K to 16K and higher, and the peak luminance of the display 180 is also increasing. Accordingly, the consumption of power supplied to the display 180 becomes higher.

Further, the display 180 can be implemented by one of various panels including a liquid crystal display panel (LCD panel), an organic light-emitting panel (OLED panel), and an inorganic light-emitting panel (LED panel).

In more detail, the liquid crystal display panel includes a backlight in addition to a panel for image display. On the other hand, the organic light-emitting panel or the inorganic light-emitting panel does not require a backlight for image display.

Further, the image display apparatus 100 according to an embodiment of the present disclosure provides a method of reducing heat generated from a circuit board in the image display apparatus 100 or decreasing the chance of a burn-out of circuit elements by properly supplying a display driving voltage in various modes available for the display 180.

Figure 2:
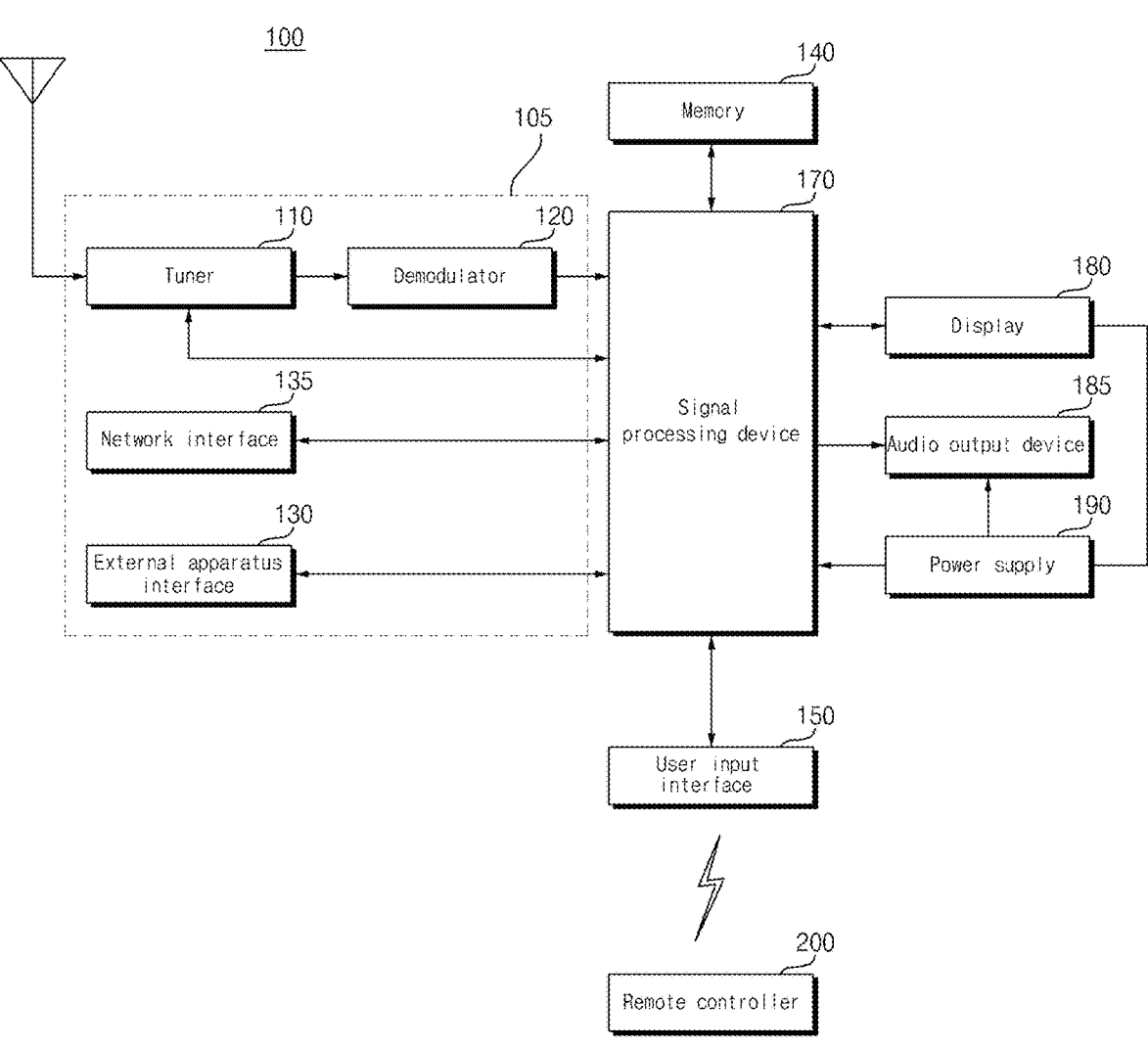
FIG. 2 is an example of an internal block diagram of the image display apparatus.

In addition, as shown in FIG. 2, the image display apparatus 100 includes the display 180, a signal processing device 170 for outputting an image signal to the display 180, and a power supply 190 for supplying a display driving voltage to the display 180.

Further, the power supply 190 outputs a display driving voltage of a first level LV1 based on a first mode, outputs a display driving voltage of a second level LV2 higher than the first level LV1, based on a second mode, and outputs a display driving voltage of a third level LV3 higher than the second level LV2, based on a third mode. Accordingly, it is possible to reduce heat generation by supplying various display driving voltages in various modes. Furthermore, it is possible to stably display images in various modes.

Further, the power supply 190 varies the level of the display driving voltage, based on an image output mode of the signal processing device 170, and in particular, outputs a higher-level display driving voltage when the image output mode of the signal processing device 170 is Cinema mode or Game mode, rather than in Eco mode, and outputs a higher-level display driving voltage when the image output mode of the signal processing device 170 is in High Dynamic Range mode, rather than in Cinema mode or Game mode. Accordingly, it is possible to reduce heat generation by supplying various display driving voltages in various modes. Furthermore, it is possible to stably display images in various modes. Also, the image display apparatus 100 of FIG. 1 may be a TV, a monitor, a tablet PC, a mobile terminal, or the like.

In more detail, FIG. 2 is an example of an internal block diagram of the image display apparatus of FIG. 1. Referring to FIG. 2, the image display apparatus 100 includes an image receiver 105, an external apparatus interface 130, a memory 140, a user input interface 150, a sensor device, a signal processing device 170, a display 180, and an audio output device 185.

As shown, the image receiver 105 can include a tuner 110, a demodulator 120, a network interface 135, and an external apparatus interface 130. Further, the image receiver 105 can include only the tuner 110, the demodulator 120, and the external apparatus interface 130. That is, the network interface 135 may not be included.

Further, the tuner 110 selects an RF broadcast signal corresponding to a channel selected by a user or all prestored channels among radio frequency (RF) broadcast signals received through an antenna. In addition, the selected RF broadcast signal is converted into an intermediate frequency signal, a baseband image, or an audio signal.

For example, if the selected RF broadcast signal is a digital broadcast signal, the tuner 110 converts the digital broadcast signal into a digital IF (DIF) signal and, if the selected RF broadcast signal is an analog broadcast signal, the tuner 110 converts the analog broadcast signal into an analog baseband image or voice (CVBS/SIF) signal. That is, the tuner 110 can process a digital broadcast signal or an analog broadcast signal. The analog baseband image or voice (CVBS/SIF) signal output from the tuner 110 can also be directly input to the signal processing device 170.

Further, the tuner 110 can include a plurality of tuners for receiving broadcast signals of a plurality of channels. Alternatively, a single tuner that simultaneously receives broadcast signals of a plurality of channels is also available.

In addition, the demodulator 120 receives the converted digital IF signal DIF from the tuner 110 and performs a demodulation operation. The demodulator 120 can perform demodulation and channel decoding and then output a stream signal TS. Also, the stream signal can be a multiplexed signal of an image signal, an audio signal, or a data signal.

In addition, the stream signal output from the demodulator 120 can be input to the signal processing device 170. The signal processing device 170 then performs demultiplexing, image/audio signal processing, and the like, outputs an image to the display 180 and outputs audio to the audio output device 185.

The external apparatus interface 130 can transmit or receive data with a connected external apparatus, e.g., a set-top box 50. In addition, the external apparatus interface 130 can include an A/V input and output device.

The external apparatus interface 130 can also be connected in wired or wirelessly to an external apparatus, such as a digital versatile disk (DVD), a Blu ray, a game equipment, a camera, a camcorder, a computer (note book), and a set-top box, and may perform an input/output operation with an external apparatus.

The A/V input and output device can receive image and audio signals from an external apparatus. A wireless transceiver can also perform short-range wireless communication with other electronic apparatus.

Thus, using the wireless transceiver, the external apparatus interface 130 can exchange data with an adjacent mobile terminal 600. In particular, in a mirroring mode, the external apparatus interface 130 can receive device information, executed application information, application image, and the like from the mobile terminal 600.

Further, the network interface 135 provides an interface for connecting the image display apparatus 100 to a wired/ wireless network including the Internet network. For example, the network interface 135 can receive, via the network, content or data provided by the Internet, a content provider, or a network operator. The network interface 135 can also include a wireless transceiver.

Further, the memory 140 can store a program for each signal processing and control in the signal processing device 170, and store signal-processed image, audio, or data signal. In addition, the memory 140 can serve to temporarily store image, audio, or data signal input to the external apparatus interface 130. The memory 140 can also store information on a certain broadcast channel through a channel memory function, such as a channel map.

FIG. 2 illustrates the memory is provided separately from the signal processing device 170, but the scope of the present disclosure is not limited thereto. For example, the memory 140 can be included in the signal processing device 170.

In addition, the user input interface 150 transmits a signal input by the user to the signal processing device 170 or transmits a signal from the signal processing device 170 to the user. For example, the user input interface 150 can transmit/receive a user input signal, such as power on/off, channel selection, screen setting, etc., from a remote controller 200, transfer a user input signal input from a local key, such as a power key, a channel key, a volume key, a set value, etc., to the signal processing device 170, transfer a user input signal input from a sensor device that senses a user's gesture to the signal processing device 170, or transmit a signal from the signal processing device 170 to the sensor device.

In addition, the signal processing device 170 can demultiplex the input stream through the tuner 110, the demodulator 120, the network interface 135, or the external apparatus interface 130, or process the demultiplexed signals to generate and output a signal for image or audio output. For example, the signal processing device 170 receives a broadcast signal received by the image receiver 105 or an HDMI signal and performs signal processing based on the received broadcast signal or the HDMI signal to thereby output a processed image signal.

Further, the image signal processed by the signal processing device 170 is input to the display 180 and can be displayed as an image corresponding to the image signal. In addition, the image signal processed by the signal processing device 170 can be input to the external output apparatus through the external apparatus interface 130.

The audio signal processed by the signal processing device 170 can be output to the audio output device 185 as an audio signal. In addition, audio signal processed by the signal processing device 170 can be input to the external output apparatus through the external apparatus interface 130.

In addition, the signal processing device 170 can also include a demultiplexer, an image processor, and the like. That is, the signal processing device 170 can perform a variety of signal processing and thus be implemented as a system on chip (SOC). This is described later with reference to FIG. 3.

In addition, the signal processing device 170 controls the overall operation of the image display apparatus 100. For example, the signal processing device 170 can control the tuner 110 to control the tuning of the RF broadcast corresponding to the channel selected by the user or the previously stored channel.

In addition, the signal processing device 170 can control the image display apparatus 100 according to a user command input through the user input interface 150 or an internal program.

Further, the signal processing device 170 can control the display 180 to display an image. Also, the image displayed on the display 180 can be a still image or a moving image, and be a 2D image or a 3D image.

Further, the signal processing device 170 can display a certain object in an image displayed on the display 180. For example, the object can be at least one of a connected web screen (newspaper, magazine, etc.), an electronic program guide (EPG), various menus, a widget, an icon, a still image, a moving image, and a text.

Further, the signal processing device 170 can recognize the position of the user based on the image photographed by a photographing device. For example, the distance (z-axis coordinate) between a user and the image display apparatus 100 can be determined. In addition, the x-axis coordinate and the y-axis coordinate in the display 180 corresponding to a user position can be determined.

In addition, the display 180 generates a driving signal by converting an image signal, a data signal, an OSD signal, a control signal processed by the signal processing device 170, an image signal, a data signal, a control signal, and the like received from the external apparatus interface 130. Further, the display 180 may be configured as a touch screen and used as an input device in addition to an output device.

Also, the audio output device 185 receives a signal processed by the signal processing device 170 and outputs it as an audio. In addition, the photographing device photographs a user and can be implemented by a single camera or a plurality of cameras. Image information photographed by the photographing device can also be input to the signal processing device 170.

Further, the signal processing device 170 can sense a gesture of the user based on each of the images photographed by the photographing device, the signals detected from the sensor device, or a combination thereof.

In addition, the power supply 190 supplies corresponding power to the image display apparatus 100. In particular, the power is supplied to a signal processing device 170 implemented as a SOC, a display 180 for displaying an image, and an audio output device 185 for outputting an audio. Specifically, the power supply 190 includes a converter to convert an AC power into a DC voltage, and a DC/DC converter to convert the level of the DC voltage.

Further, the remote controller 200 transmits the user input to the user input interface 150. In particular, the remote controller 200 can use Bluetooth, a radio frequency (RF) communication, an infrared (IR) communication, an Ultra Wideband (UWB), ZigBee, or the like. In addition, the remote controller 200 can receive the image, audio, or data signal output from the user input interface 150, and display it on the remote controller 200 or output it as an audio.

Further, the image display apparatus 100 can be a fixed or mobile digital broadcast receiver capable of receiving digital broadcast. Also, each component of the block diagram in FIG. 2 can be integrated, added, or omitted according to a specification of the image display apparatus 100. That is, two or more components can be combined into a single component as needed, or a single component can be split into two or more components. The function performed in each block is described for the purpose of illustrating embodiments of the present disclosure, and specific operation and apparatus do not limit the scope of the present disclosure.

Figure 3:
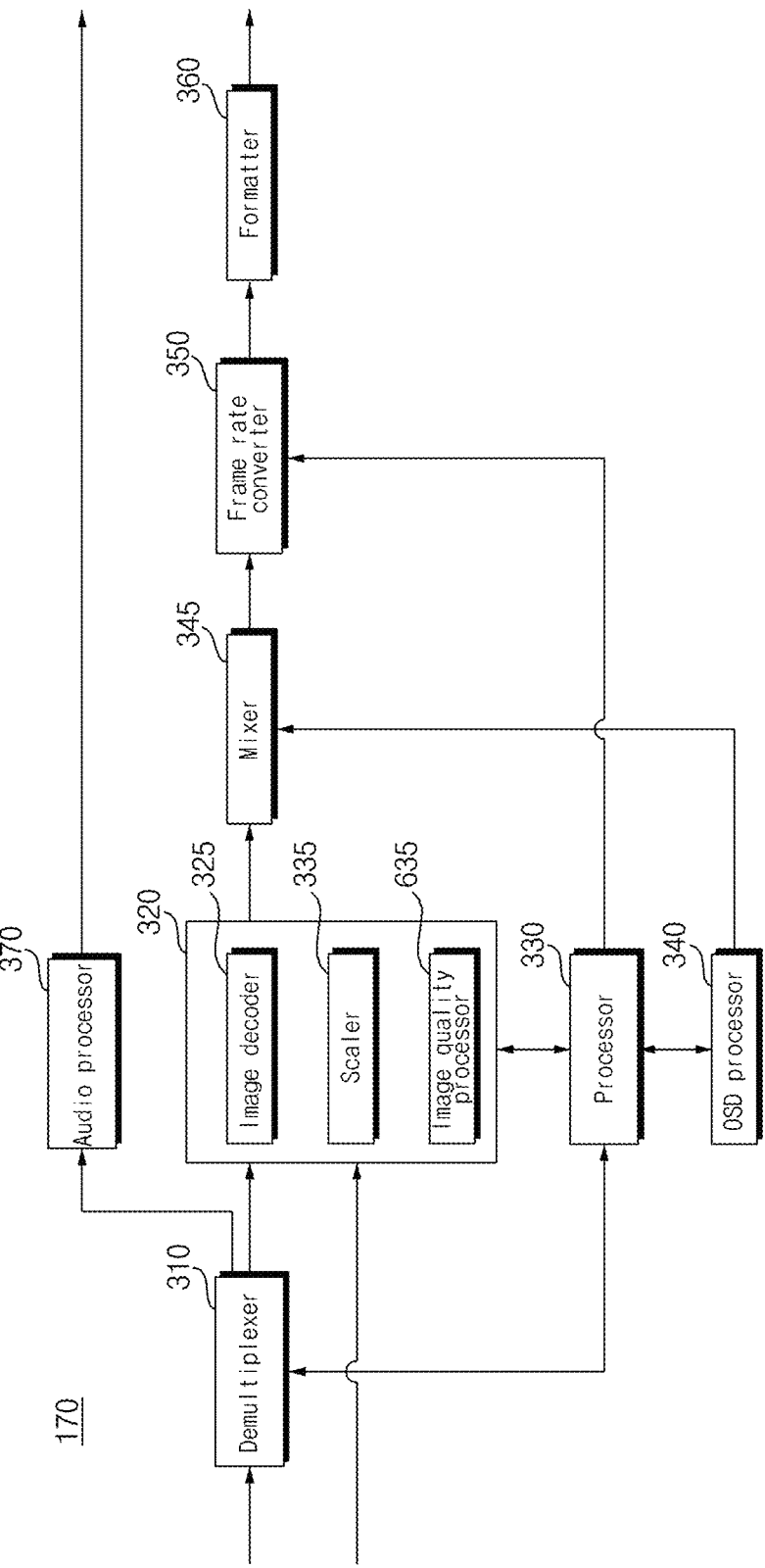
FIG. 3 is an example of an internal block diagram of a signal processing device of FIG. 2.

Next, FIG. 3 is an example of an internal block diagram of the signal processing device in FIG. 2. Referring to FIG. 3, the signal processing device 170 can include a demultiplexer 310, an image processor 320, a processor 330, and an audio processor 370. In addition, the signal processing device 170 can include and a data processor.

In more detail, the demultiplexer 310 demultiplexes the input stream. For example, an MPEG-2 TS input can be demultiplexed into image, audio, and data signal, respectively. Here, the stream signal input to the demultiplexer 310 can be a stream signal output from the tuner 110, the demodulator 120, or the external apparatus interface 130.

In addition, the image processor 320 may perform signal processing on an input image. For example, the image processor 320 can perform image processing on an image signal demultiplexed by the demultiplexer 310.

As shown in FIG. 3, the image processor 320 can include an image decoder 325, a scaler 335, an image quality processor 635, an image encoder, an OSD processor 340, a frame rate converter 350, a formatter 360, etc. Also, the image decoder 325 decodes a demultiplexed image signal, and the scaler 335 performs scaling so that the resolution of the decoded image signal can be output from the display 180.

Further, the image decoder 325 can include a decoder of various standards. For example, a 3D image decoder for MPEG-2, H.264 decoder, a color image, and a depth image, and a decoder for a multiple view image may be provided.

Also, the scaler 335 can scale an input image signal decoded by the image decoder 325 or the like. For example, if the size or resolution of an input image signal is small, the scaler 335 can upscale the input image signal, and if the size or resolution of the input image signal is great, the scaler 335 can downscale the input image signal.

In addition, the image quality processor 635 performs image quality processing on an input image signal decoded by the image decoder 325 or the like. For example, the image quality processor 635 can perform noise reduction processing on an input image signal, extend a resolution of high gray level of the input image signal, perform image resolution enhancement, perform high dynamic range (HDR)-based signal processing, change a frame rate, perform image quality processing suitable for properties of a panel, especially an OLED panel, etc.

Also, the OSD processor 340 generates an OSD signal according to a user input or by itself. For example, based on a user input signal, the OSD processor 340 can generate a signal for displaying various information as a graphic or a text on the screen of the display 180. The generated OSD signal can include various data, such as a user interface screen of the image display apparatus 100, various menu screens, a widget, and an icon. In addition, the generated OSD signal can include a 2D object or a 3D object.

Further, the OSD processor 340 can generate a pointer displayed on the display, based on a pointing signal input from the remote controller 200. In particular, such a pointer can be generated by a pointing signal processing device, and the OSD processor 340 can include such a pointing signal processing device. Also, the pointing signal processing device can be provided separately from the OSD processor 340.

In addition, the frame rate converter (FRC) 350 converts a frame rate of an input image and can also output the input image without converting the frame rate. Further, the formatter 360 can change a format of an input image signal into a format suitable for displaying the image signal on a display and output the image signal in the changed format. In particular, the formatter 360 can change a format of an image signal to correspond to a display panel.

Further, the formatter 360 can convert the format of an image signal. For example, the formatter 360 can convert the format of a 3D image signal into one of various 3D formats, including a side-by-side format, a top/down format, a frame sequential format, an interlaced format, a checker box format, etc.

Also, the processor 330 controls overall operations of the image display apparatus 100 or the signal processing device 170. For example, the processor 330 can control the tuner 110 to control the tuning of an RF broadcast corresponding to a channel selected by a user or a previously stored channel.

In addition, the processor 330 can control the image display apparatus 100 according to a user command input through the user input interface 150 or an internal program. The processor 330 can also transmit data to the network interface 135 or to the external apparatus interface 130.

In addition, the processor 330 can control the demultiplexer 310, the image processor 320, and the like in the signal processing device 170. Further, the audio processor 370 in the signal processing device 170 can perform the audio processing of the demultiplexed audio signal and can include various decoders. The audio processor 370 in the signal processing device 170 can also process a base, a treble, a volume control, and the like.

The data processor in the signal processing device 170 performs data processing of the demultiplexed data signal. For example, when the demultiplexed data signal is a coded data signal, the data signal be decoded. The encoded data signal can be electronic program guide information including broadcast information, such as a start time and an end time of a broadcast program broadcasted on each channel.

Also, each component of the block diagram in FIG. 3 can be integrated, added, or omitted according to a specification of the signal processing device 170 actually implemented. In particular, the frame rate converter 350 and the formatter 360 can be provided separately in addition to the image processor 320.

Figure 4A:
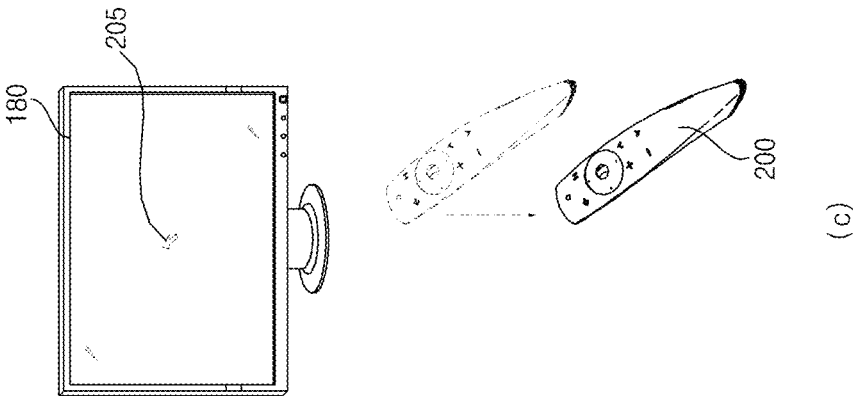
FIG. 4A is a diagram showing a method of controlling a remote controller of FIG. 2.
Figure 4A:
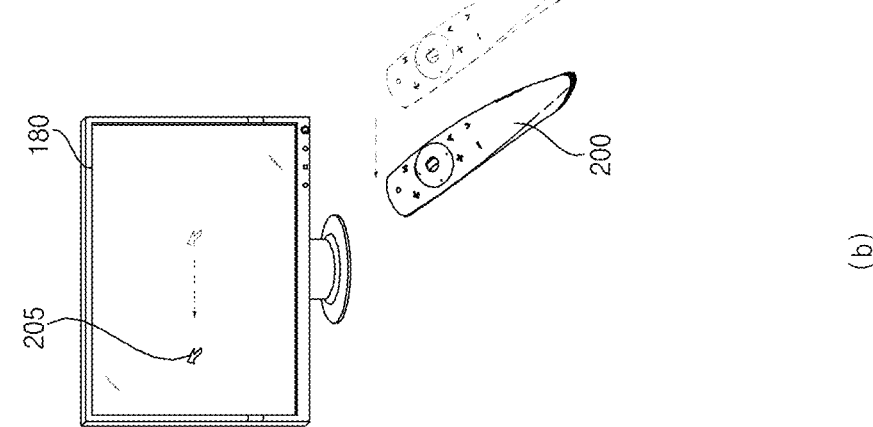
Figure 4A:
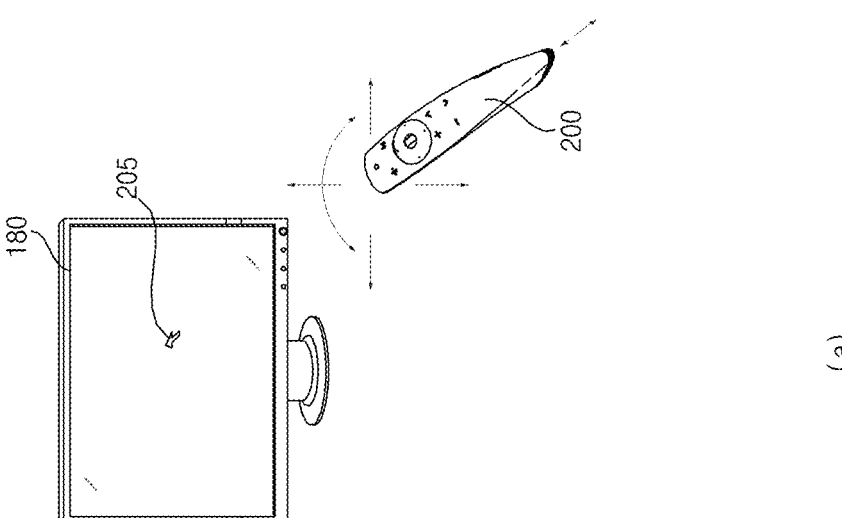

Next, FIG. 4A is a diagram illustrating a control method of a remote controller of FIG. 2. In particular, FIG. 4A(a) illustrates a pointer 205 corresponding to the remote controller 200 displayed on the display 180.

The user can move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 can be referred to as a space remote controller or a 3D pointing apparatus, because the pointer 205 is moved and displayed according to the movement in a 3D space, as shown in the FIG. 4A.

Next, FIG. 4A(b) illustrates that when the user moves the remote controller 200 to the left, the pointer 205 displayed on the display 180 of the image display apparatus also moves to the left correspondingly. Information on the motion of the remote controller 200 detected through a sensor of the remote controller 200 is transmitted to the image display apparatus. The image display apparatus can calculate the coordinate of the pointer 205 from the information on the motion of the remote controller 200. The image display apparatus can also display the pointer 205 to correspond to the calculated coordinate.

Next, FIG. 4A(c) illustrates the user moving the remote controller 200 away from the display 180, while pressing a specific button of the remote controller 200. Thus, a selection area within the display 180 corresponding to the pointer 205 can be zoomed in and enlarged. Further, when the user moves the remote controller 200 close to the display 180, the selection area within the display 180 corresponding to the pointer 205 can be zoomed out and reduced. When the remote controller 200 moves away from the display 180, the selection area can also be zoomed out, and when the remote controller 200 approaches the display 180, the selection area can be zoomed in.

Further, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed. Further, the moving speed or the moving direction of the pointer 205 can correspond to the moving speed or the moving direction of the remote controller 200.

Figure 4B:
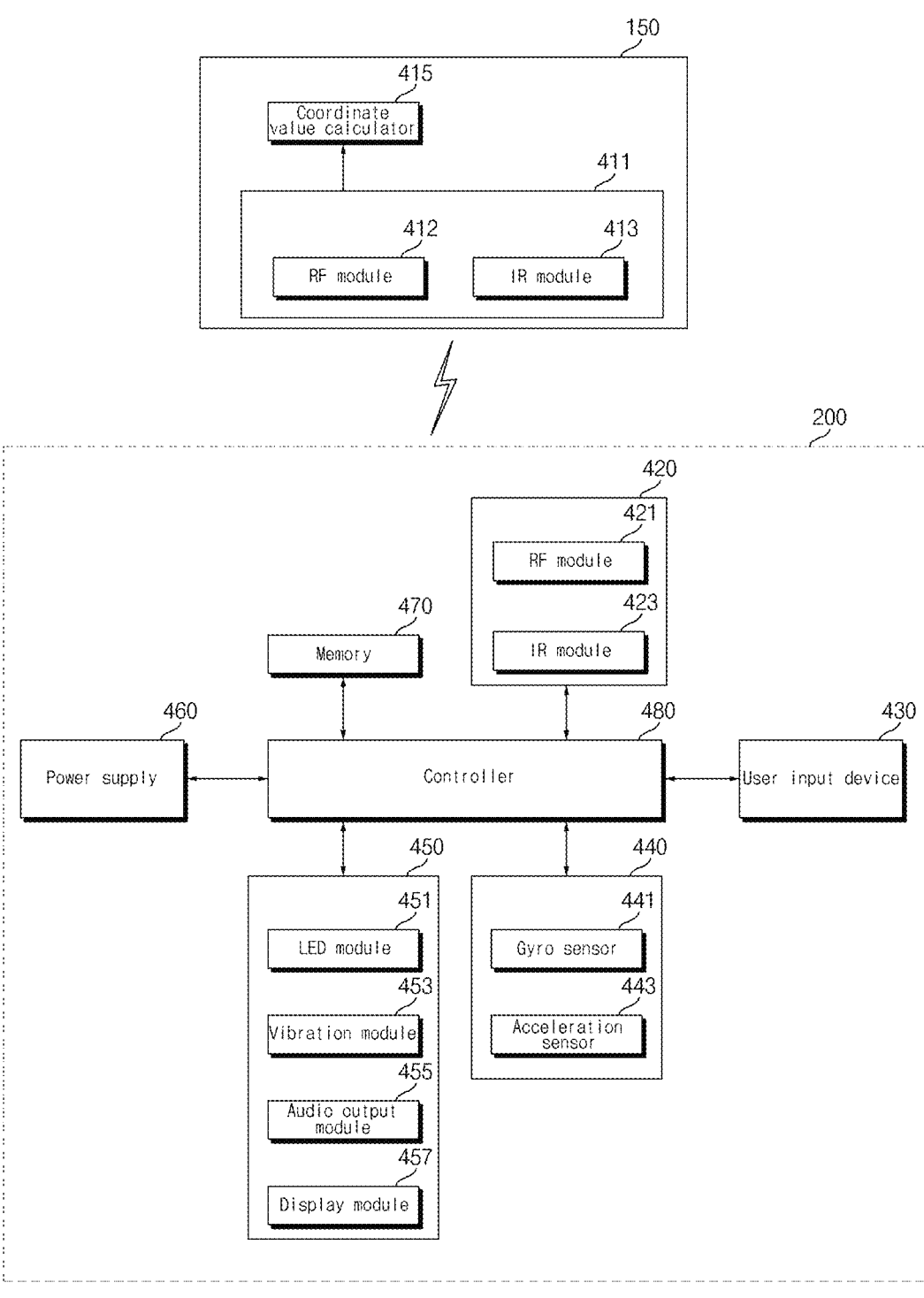
FIG. 4B is an internal block diagram of the remote controller of FIG. 2.

Next, FIG. 4B is an internal block diagram of the remote controller of FIG. 2. As shown, the remote controller 200 includes a wireless transceiver 425, a user input device 435, a sensor device 440, an output device 450, a power supply 460, a memory 470, and a controller 480.

The wireless transceiver 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 can include an RF module 421 for transmitting and receiving signals to and from the image display apparatus 100 according to a RF communication standard. In addition, the remote controller 200 can include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421. In addition, the remote controller 200 can receive the signal transmitted by the image display apparatus 100 through the RF module 421. In addition, if necessary, the remote controller 200 can transmit a command related to power on/off, channel change, volume change, and the like to the image display apparatus 100 through the IR module 423.

The user input device 435 can be implemented by a keypad, a button, a touch pad, a touch screen, or the like. The user can operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user can touch a soft key of the touch screen to input the command related to the image display apparatus 100 to the remote controller 200. In addition, the user input device 435 can include various types of input mechanisms, such as a scroll key, a jog key, etc., which can be operated by the user.

Further, the sensor device 440 can include a gyro sensor 441 or an acceleration sensor 443. In particular, the gyro sensor 441 can sense information regarding the motion of the remote controller 200. For example, the gyro sensor 441 can sense information on the operation of the remote controller 200 based on the x, y, and z axes. Also, the acceleration sensor 443 can sense information on the moving speed of the remote controller 200. Further, a distance measuring sensor may be further provided, and thus, the distance to the display 180 may be sensed.

The output device 450 can output an image or an audio signal corresponding to the operation of the user input device 435 or a signal transmitted from the image display apparatus 100. Through the output device 450, the user can recognize whether the user input device 435 is operated or whether the image display apparatus 100 is controlled.

For example, the output device 450 can include an LED module 451 that is turned on when the user input device 435 is operated or a signal is transmitted/received to/from the image display apparatus 100 through the wireless transceiver 425, a vibration module 453 for generating a vibration, an audio output module 455 for outputting an audio, or a display module 457 for outputting an image.

In addition, the power supply 460 supplies power to the remote controller 200. When the remote controller 200 is not moved for a certain time, the power supply 460 can stop the supply of power to reduce a power waste. The power supply 460 can also resume power supply when a certain key provided in the remote controller 200 is operated.

Further, the memory 470 can store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 can also store information regarding a frequency band or the like for wirelessly transmitting and receiving a signal to/from the image display apparatus 100 paired with the remote controller 200 in the memory 470 and can refer to the stored information.

Further, the controller 480 controls various matters related to the control of the remote controller 200. In particular, the controller 480 can transmit a signal corresponding to a certain key operation of the user input device 435 or a signal corresponding to the motion of the remote controller 200 sensed by the sensor device 440 to the image display apparatus 100 through the wireless transceiver 425.

In addition, the user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 can wirelessly transmit and receive a signal to and from the remote controller 200 through the RF module 412. In addition, the user input interface 150 can receive a signal transmitted by the remote controller 200 through the IR module 413 according to an IR communication standard.

Further, the coordinate value calculator 415 can correct a handshake or an error from a signal corresponding to the operation of the remote controller 200 received through the wireless transceiver 151 and calculate the coordinate value (x, y) of the pointer 205 to be displayed on the display 180.

In addition, the transmission signal of the remote controller 200 input to the image display apparatus 100 through the user input interface 150 is transmitted to the controller 180 of the image display apparatus 100. The controller 180 can determine the information on the operation of the remote controller 200 and the key operation from the signal transmitted from the remote controller 200, and correspondingly, control the image display apparatus 100.

In another example, the remote controller 200 can calculate the pointer coordinate value corresponding to the operation and output it to the user input interface 150 of the image display apparatus 100. In this instance, the user input interface 150 of the image display apparatus 100 can transmit information on the received pointer coordinate value to the controller 180 without a separate correction process of handshake or error. In still another example, the coordinate value calculator 415 can be provided in the signal processing device 170, not in the user input interface 150.

Figure 5:
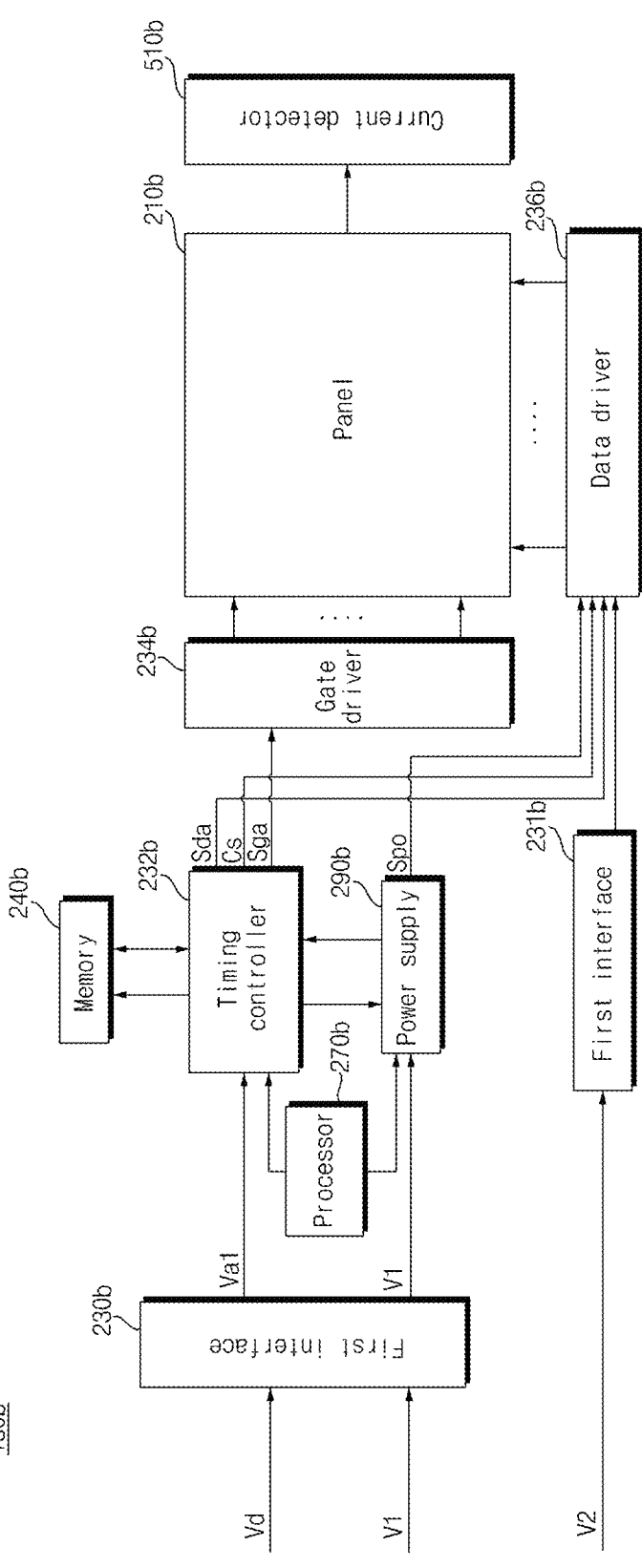
FIG. 5 is an exemplary internal block diagram of a display of FIG. 2.

Next, FIG. 5 is an exemplary internal block diagram of a display of FIG. 2. Referring to FIG. 5, an organic light-emitting panel-based display 180b can include an organic light-emitting panel 210b, a first interface 230b, a second interface 231b, a timing controller 232b, a gate driver 234b, a data driver 236b, a memory 240b, a processor 270b, a power supply 290b, a current detector 510b, and the like.

The display 180b receives an image signal Vdb, a first DC voltage V1b, and a second DC voltage V2b, and can display a certain image based on the image signal Vdb. Further, the first interface 230b in the display 180b can receive the image signal Vdb and the first DC voltage V1b from the signal processing device 170b. Here, the first DC voltage V1b can be used for the operation of the power supply 290b and the timing controller 232b in the display 180b.

Next, the second interface 231b can receive a second DC voltage V2b from an external power supply 190b. Further, the second DC voltage V2b can be input to the data driver 236b in the display 180b. The timing controller 232b can output a data driving signal Sdab and a gate driving signal Sgab, based on the image signal Vdb.

For example, when the first interface 230b converts the input image signal Vdb and outputs the converted image signal va1b, the timing controller 232b can output the data driving signal Sdab and the gate driving signal Sgab based on the converted image signal va1b. The timing controller 232b can further receive a control signal, a vertical synchronization signal Vsyncb, and the like, in addition to the image signal Vdb from the signal processing device 170b.

In addition to the image signal Vdb, based on a control signal, a vertical synchronization signal Vsyncb, and the like, the timing controller 232b generates a gate driving signal Sgab for the operation of the gate driver 234*b*, and a data driving signal Sdab for the operation of the data driver 236*b*. Also, when the panel 210*b* includes a RGBW sub-pixel, the data driving signal Sdab can be a data driving signal for driving of RGBW subpixel. Further, the timing controller 232*b* can further output a control signal Csb to the gate driver 234*b*.

The gate driver 234*b* and the data driver 236*b* supply a scan signal and an image signal to the organic light-emitting panel 210*b* through a gate line GLb and a data line DLb, respectively, according to the gate driving signal Sgab and the data driving signal Sdab from the timing controller 232*b*. Accordingly, the organic light-emitting panel 210*b* displays a certain image.

Further, the panel 210*b* can include an organic light emitting layer. In order to display an image, a plurality of gate lines GLb and data lines DLb can be disposed in a matrix form in each pixel corresponding to the organic light emitting layer. Further, the data driver 236*b* can output a data signal to the organic light-emitting panel 210*b* based on a second DC voltage V2b from the second interface 231*b*.

In addition, the power supply 290*b* can supply various power supplies to the gate driver 234*b*, the data driver 236*b*, the timing controller 232*b*, and the like. Also, the current detector 510*b* can detect the current flowing in a sub-pixel of the panel 210*b*, and the detected current can be input to the processor 270*b* or the like, for a cumulative current calculation.

In addition, the processor 270*b* can perform each type of control of the display 180*b*. For example, the processor 270*b* can control the gate driver 234*b*, the data driver 236*b*, the timing controller 232*b*, and the like. Further, the processor 270*b* can receive current information flowing in a sub-pixel of the panel 210*b* from the current detector 510*b*.

Figure 6A:
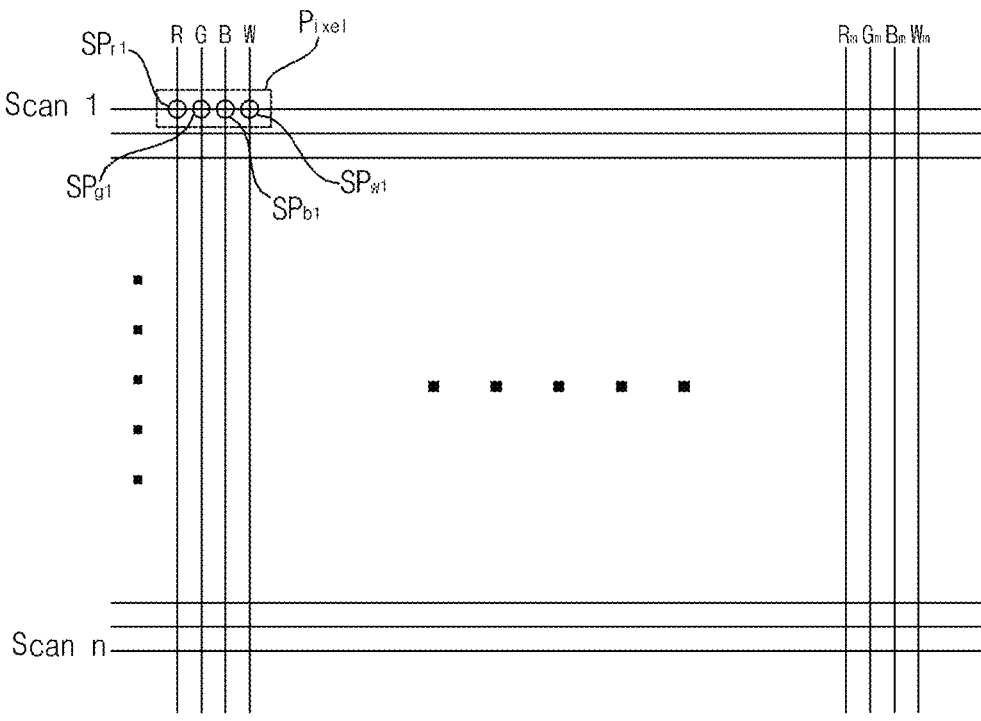
FIGS. 6A and 6B are diagrams referred to in the description of an organic light-emitting panel of FIG. 5.
Figure 6B:
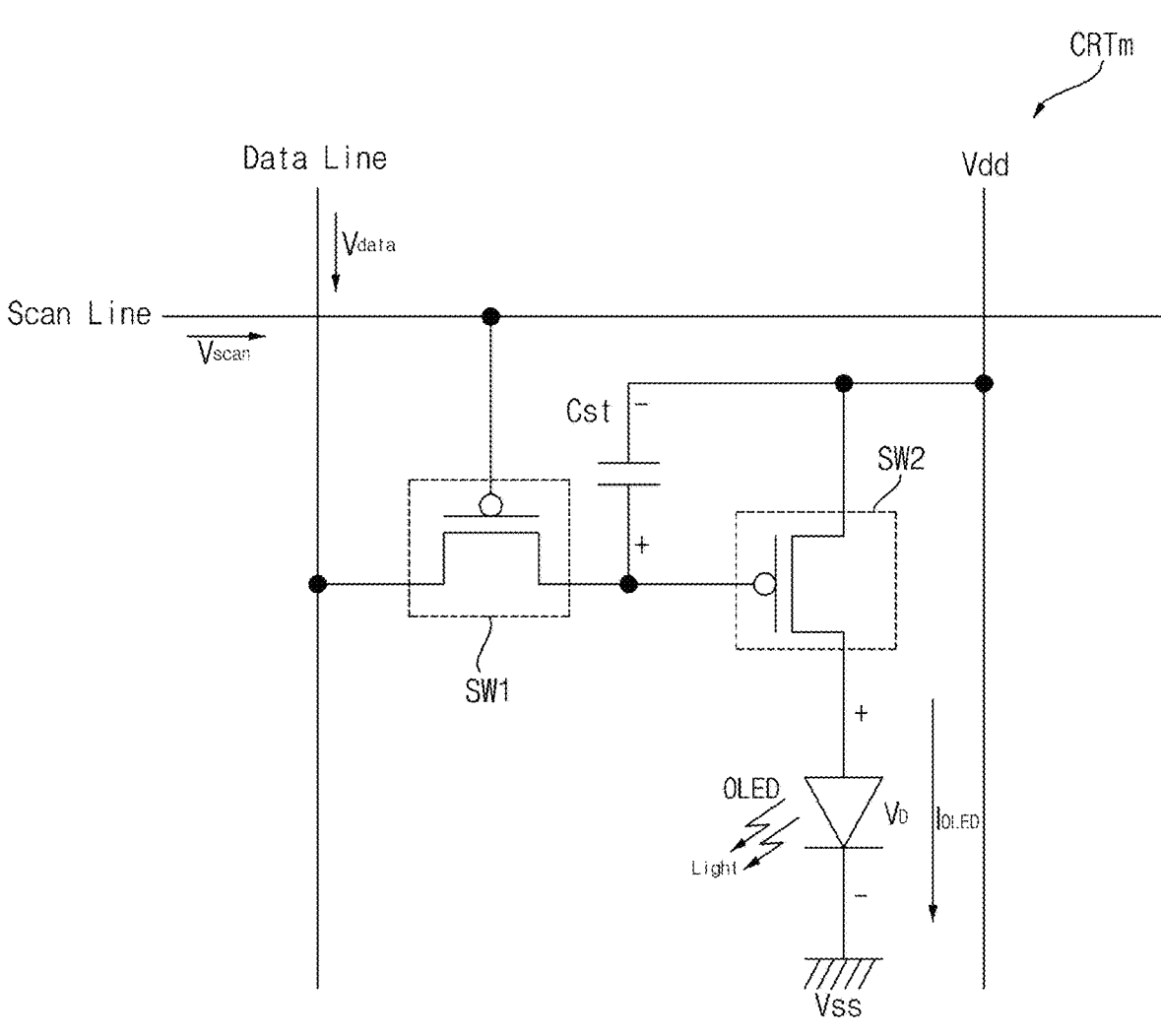

Next, FIGS. 6A and 6B are diagrams illustrating an organic light-emitting panel of FIG. 5. First, FIG. 6A is a diagram illustrating a pixel in the organic light-emitting panel 210*b*.

Referring to FIG. 6A, the organic light-emitting panel 210*b* can include a plurality of scan lines Scan1 to Scann and a plurality of data lines R1, G1, B1, W1 to Rm, Gm, Bm, Wm intersecting the scan lines. Further, a pixel (subpixel) is defined in an intersecting area of the scan line and the data line in the organic light-emitting panel 210*b*. In FIG. 6A, a pixel including sub-pixels SR1, SG1, SB1, and SW1 of RGBW is shown.

Next, FIG. 6B illustrates a circuit of any one sub-pixel in the pixel of the organic light-emitting panel of FIG. 6A. Referring to FIG. 6B, an organic light-emitting sub pixel circuit CRTm can include, as an active type, a scan switch-ing element SW1, a storage capacitor Cst, a drive switching element SW2, and an organic light emitting layer OLED.

Further, the scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

In addition, as shown, the storage capacitor Cst is formed between the gate terminal and the source terminal of the drive switching element SW2, and stores a certain difference between a data signal level transmitted to one end of the storage capacitor Cst and a DC voltage (VDD) level trans-mitted to the other terminal of the storage capacitor Cst. For example, when the data signal has a different level according to a Plume Amplitude Modulation (PAM) method, the power level stored in the storage capacitor Cst varies according to the level difference of the data signal Vdata.

In another example, when the data signal has a different pulse width according to a pulse width modulation (PWM) method, the power level stored in the storage capacitor Cst varies according to the pulse width difference of the data signal Vdata.

In addition, the drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

Further, the organic light emitting layer OLED can include a light emitting layer (EML) of RGBW correspond-ing to a subpixel, and can include at least one of a hole injecting layer (HIL), a hole transporting layer (HTL), an electron transporting layer (ETL), and an electron injecting layer (EIL). In addition, organic light emitting layer OLED can include a hole blocking layer, and the like.

Further, the subpixels emit a white light in the organic light emitting layer OLED. However, for green, red, and blue subpixels, a subpixel is provided with a separate color filter for color implementation. That is, in the case of green, red, and blue subpixels, each of the subpixels further includes green, red, and blue color filters. Further, because a white subpixel outputs a white light, a separate color filter is not required.

FIG. 6B illustrates that a p-type MOSFET is used for a scan switching element SW1 and a drive switching element SW2, but an n-type MOSFET or other switching element, such as a JFET, IGBT, SIC, or the like are also available. Further, the pixel is a hold-type element that continuously emits light in the organic light emitting layer (OLED), after a scan signal is applied, during a unit display period, specifically, during a unit frame.

Figure 7:
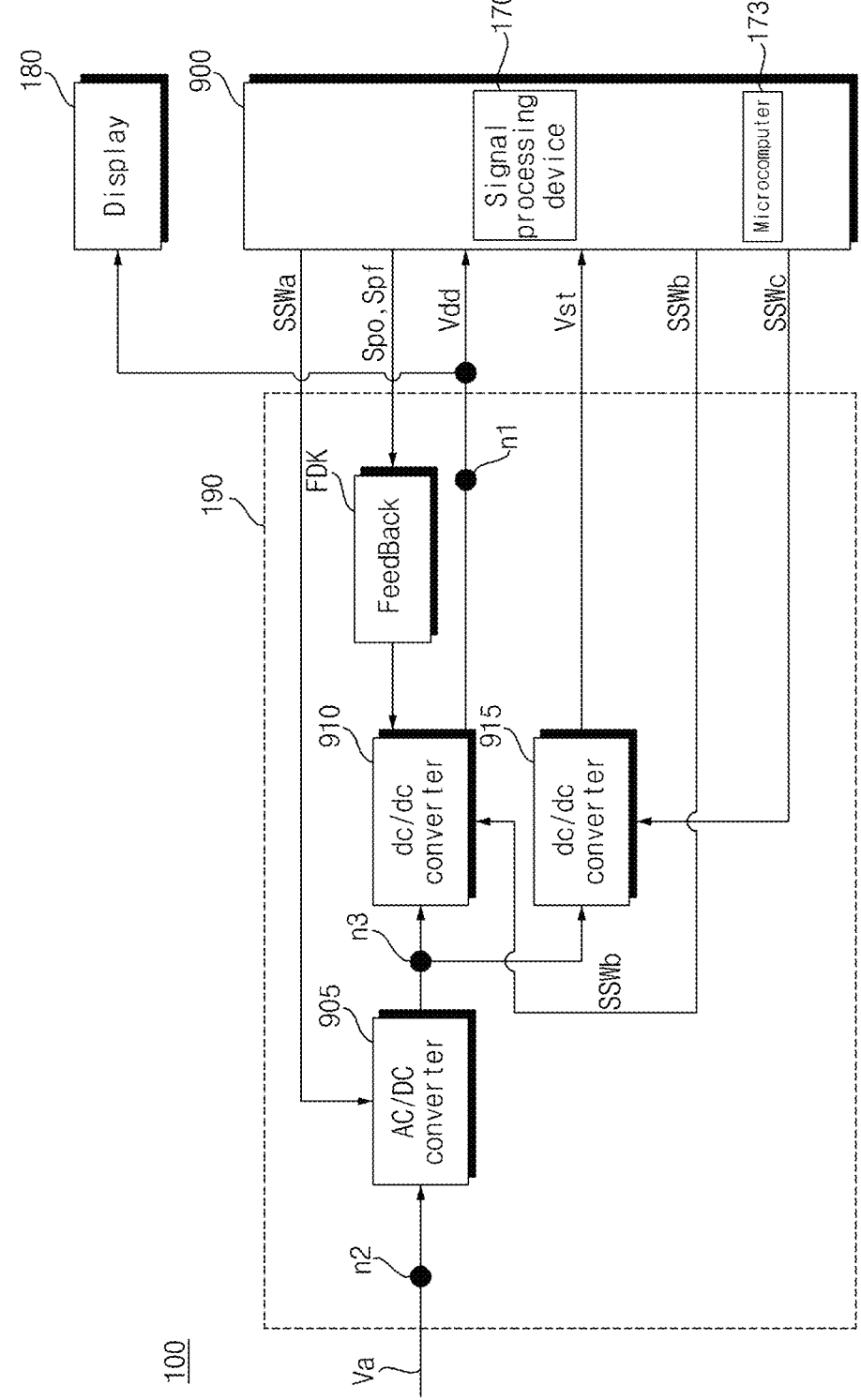
FIG. 7 is an exemplary internal block diagram of an image display apparatus according to an embodiment of the present disclosure.

Next, FIG. 7 is an exemplary internal block diagram of an image display apparatus according to an embodiment of the present disclosure. Referring to FIG. 7, the image display apparatus 100 includes a display 180, a signal processing device 170 for outputting an image signal to the display 180, and a power supply 190 for supplying a display driving voltage to the display 180.

The power supply 190 can include an ac/dc converter 905 for converting an input AC voltage into a DC voltage, and a dc/dc converter 910 for converting the level of the DC voltage from the ac/dc converter 905 to output a display driving voltage Vdd.

FIG. 7 illustrates the ac/dc converter 905 is disposed between Node n2, which is an input terminal of the power supply 190, and an input node n3 of the dc/dc converter 910. Further, an output node n1 of the ac/dc converter 905 can be electrically connected to the display 180.

The ac/dc converter 905 can include a diode or a switch-ing element, and convert an input AC voltage Va into a DC voltage of a first level and output the voltage. The dc/dc converter 910 can convert an input DC voltage of the first level and output a display driving voltage VDD of a second level. For example, the converter 910 can boost the DC voltage of the first level and output the display driving voltage Vdd of the second level higher than the first level.

Also, if the display 180 is an organic light-emitting panel, the display driving voltage Vdd can be a pixel driving voltage for an organic light-emitting pixel. If the display 180 is an inorganic light-emitting panel, the display driving voltage Vdd can be a pixel driving voltage for an inorganic light-emitting pixel. Also, if the display 180 is a liquid crystal panel, the display driving voltage Vdd can be a backlight driving voltage or a liquid crystal pixel driving voltage.

Further, the image display apparatus 100 also includes a main board 900 including a signal processing device 170 and a microcomputer 173. The signal processing device 170 can output an image signal to the display 180. Upon receiving a remote control signal, the microcomputer 173 can be operated to control the operation of the signal processing device 170 or the power supply 190.

Further, the power supply 190 can output a microcomputer driving voltage Vst for the operation of the microcomputer 173. Also, the power supply 190 can further include a second dc/dc converter 915 for converting an input DC voltage of a first level to output a microcomputer driving voltage Vst of a third level.

Also, the microcomputer driving voltage Vst can be lower than the display driving voltage Vdd. Further, the mainboard 900 or the signal processing device 170 can output a display-on signal Spo or a display-off signal Spf to the power supply 190. Accordingly, if the display 180 is on, the dc/dc converter 910 can be operated, and if the display 180 is off, the dc/dc converter 910 can stop operating.

Also, the main board 900 or the signal processing device 170 can output a switch driving control signal SSwa to the ac/dc converter 905. Accordingly, the ac/dc converter 905 can be stably driven. In addition, the mainboard 900 or the signal processing device 170 can output a switch driving control signal SSwb to the dc/dc converter 910. Accordingly, the dc/dc converter 910 can be stably driven.

In addition, the mainboard 900 or the signal processing device 170 can output a switch driving control signal SSwc to the second dc/dc converter 915. Accordingly, the second dc/dc converter 915 can be stably driven. Further, the power supply 190 can further include a signal transmitter FDK connected between the converter 910 and the mainboard 900.

In addition, the signal transmitter FDK can receive a display-on signal Spo or a display-off signal Spf from the mainboard 900 including the signal processing device 170 or from the signal processing device 170, and transmit the display-on signal Spo or the display-off signal Spf to the converter 910.

Figure 8:
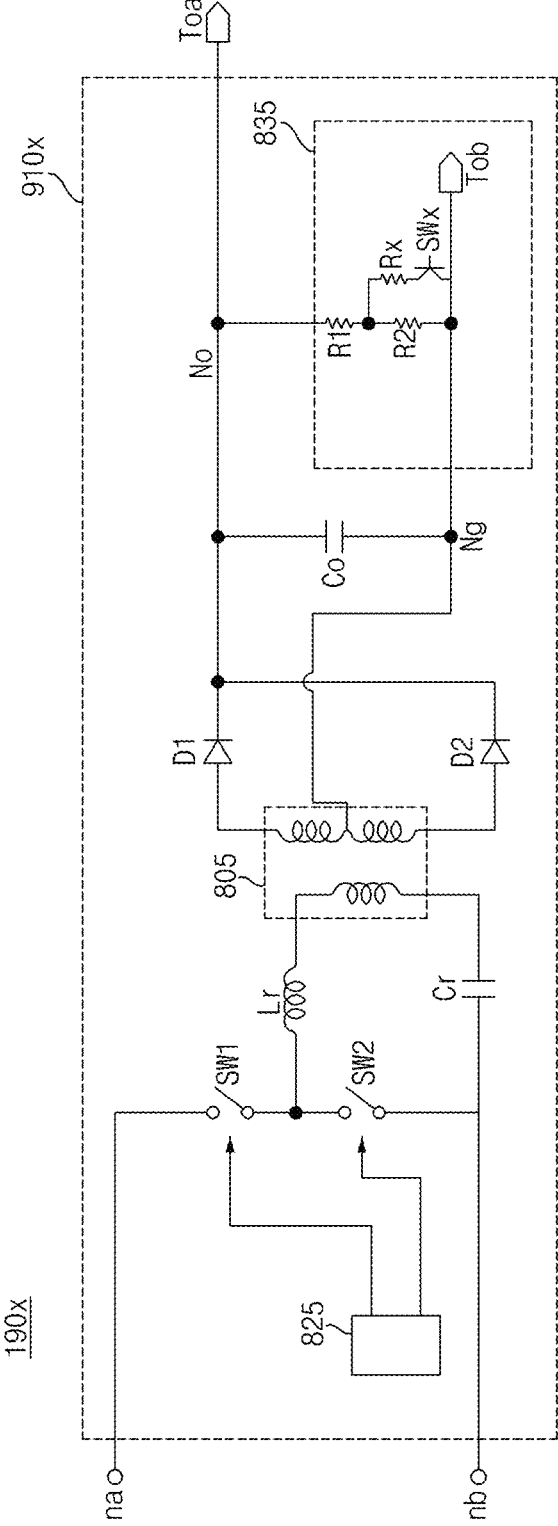
FIG. 8 is an exemplary circuit diagram of a power supply related to the present disclosure.

Next, FIG. 8 is an exemplary circuit diagram of a power supply according to an example of the present disclosure. Referring to FIG. 8, the power supply 190x related to the present disclosure includes a converter 910x for outputting a display driving voltage.

As shown, the converter 910x includes a transformer 805, switching elements SW1 and SW2 disposed at an input terminal of the transformer 805 and connected in series to each other, a capacitor Cr disposed between the switching element SW2 and the transformer 805, an inductor Lr, a multi-level voltage output circuit 835 disposed at an output terminal of the transformer 805, and a switching controller 825.

Also, the multi-level voltage output circuit 835 includes resistor elements R1 and R2 connected in series to each other, a resistor element Rx connected in parallel to the resistor element R2, and a switching element SWx. In accordance with the multi-level voltage output circuit 835, the switching element SWx is turned on in the first mode, and the resistor element R2 and the resistor element Rx are connected in parallel. Thus, the total resistance of the resistor element R1 and the resistor elements R2 and Rx connected in parallel is represented by a first resistance value, and therefore a display driving voltage of a first level is output.

In accordance with the multi-level voltage output circuit 835, the switching element SWx is turned off in the second mode. Thus, the total resistance of the resistor element R2 connected in series to the resistor element R1 is represented by a second resistance value which is higher than the first resistance value, and therefore a display driving voltage of a second level higher than the first level is output.

In this manner, the power supply 190x outputs a display driving voltage of a first level in the first mode, and outputs a display driving voltage of a second level in the second mode. For example, the first mode can be Normal mode, and the second mode can be Game mode.

Further, in High Dynamic Range (HDR) mode, apart from Normal mode and Cinema mode, the peak luminance displayed on the display 180 becomes higher than in Normal mode or Game mode. In the HDR mode, when the power supply 190x supplies a display driving voltage of a second level to the display 180, the peak luminance cannot be represented because the HDR mode is not distinguished from Game mode or the like.

Furthermore, in the HDR mode, when the power supply 190x supplies a display driving voltage of a second level to the display 180, the turn-on duty of the switching elements SW1 and SW2 in the power supply 190x becomes higher than in Game mode or the like. Thus, the current flowing in the power supply 190x increases, and more heat is generated, thereby increasing the chance of burn-out in circuit elements of the power supply 190x.

In the present disclosure, to resolve this issue, the HDR mode is set to different from the second mode so that a display driving voltage of a third level higher than a driving voltage of a second level is applied to the display 180. This is described with reference to FIG. 9.

Figure 9:
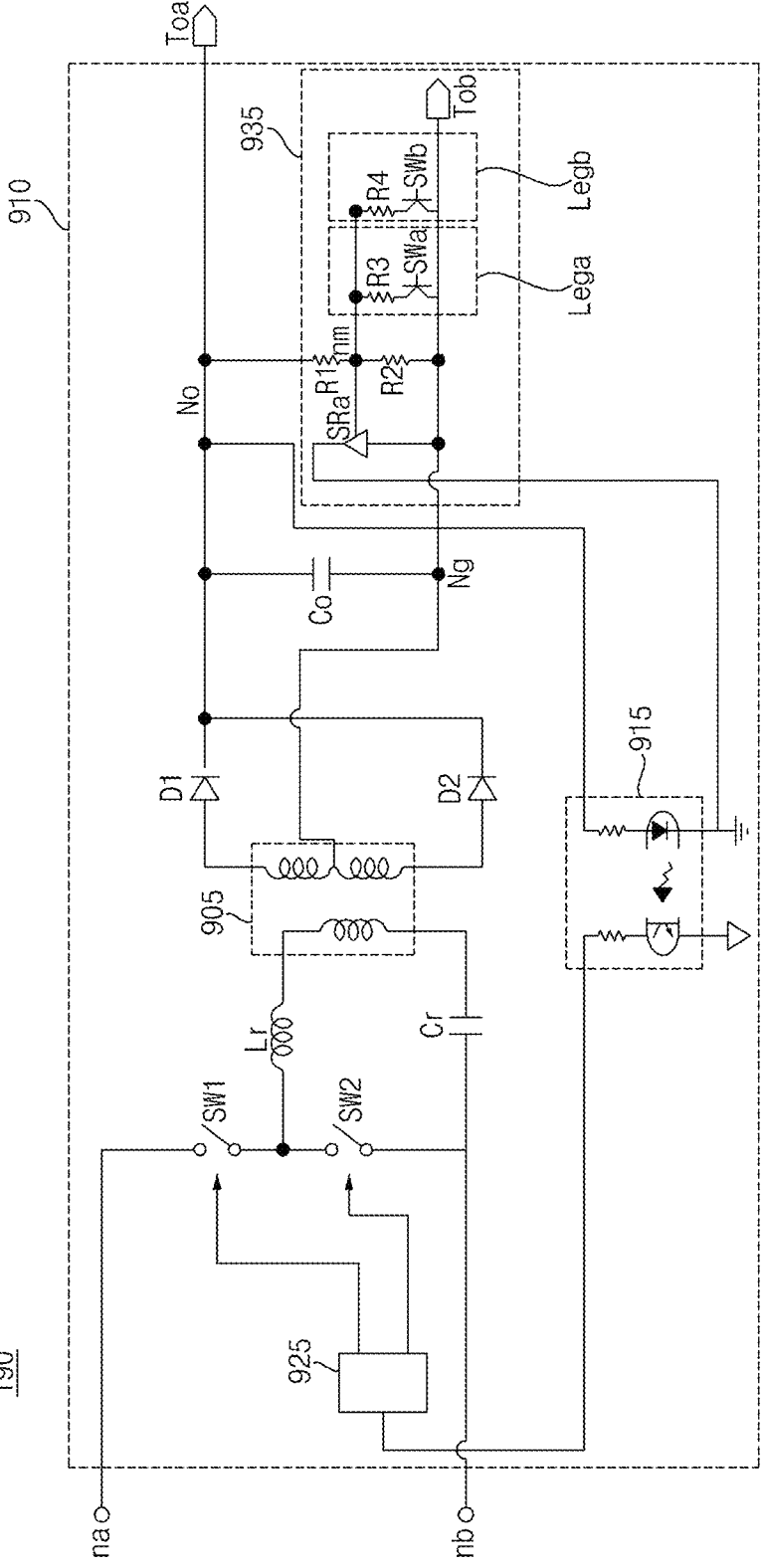
FIG. 9 is an exemplary circuit diagram of a power supply according to an embodiment of the present disclosure.

In more detail, FIG. 9 is an exemplary circuit diagram of a power supply according to an embodiment of the present disclosure. Referring to FIG. 9, the power supply 190 outputs a display driving voltage of a first level LV1, based on a first mode, outputs a display driving voltage of a second level LV2 higher than the first level LV1, based on a second mode, and outputs a display driving voltage of a third level LV3 higher than the second level LV2, based on a third mode. Accordingly, it is possible to reduce heat generation by supplying various display driving voltages in various modes. Furthermore, it is possible to stably display images in various modes.

Further, as shown in FIG. 9, the power supply 190 includes a converter 910 for converting an input voltage to output a DC voltage. Also, the converter 910 can be the dc/dc converter shown in FIG. 7.

The converter 910 can include a transformer 905 and a multi-level voltage output circuit 935 connected to an output terminal No-Ng of the transformer 905, and configured to output either a display driving voltage of a first level LV1, a display driving voltage of a second level LV2, or a display driving voltage of a third level LV3, based on one of the first to third modes.

In particular, a display driving voltage can be output through the Toa terminal. The Tob terminal can be a ground terminal. Further, the converter 910 can include a capacitor Co disposed between the output terminal No-Ng of the transformer 905 and the multi-level voltage output circuit 935.

Also, the multi-level voltage output circuit 935 includes a first resistor element R1 and a second resistor element R2 disposed at the output terminal No-Ng of the transformer 905 and connected in series to each other, a third resistor element R3 and a first switching element SWa disposed at a first leg connected in parallel to both ends of the second resistor element R2, and connected in series to each other, and a fourth resistor element R4 and a second switching element SWb disposed at a second leg connected in parallel to both ends of the second resistor element R2, and connected in series to each other.

That is, the third resistor element R3 and the first switching element SWa connected in series to each other are disposed at the first leg between an nm terminal and an Ng terminal, which are both ends of the second resistor element R2. Also, the fourth resistor element R4 and the second switching element SWb connected in series to each other are disposed at the second leg between the nm terminal and the Ng terminal, which are both ends of the second resistor element R2.

Further, the power supply 190 can output one of the display driving voltages of the first to third levels LV1 and LV3, based on the turn-on or turn-off of the first switching element SWa or the second switching element SWb. For example, in the first mode, if both the first switching element SWa and the second switching element SWb are turned off, the power supply 190 can output a display driving voltage of a first level LV1.

As another example, in the second mode, if one of the first switching element SWa and the second switching element SWb is turned on, and the other one is turned off, the power supply 190 can output a display driving voltage of a second level LV2.

As yet another example, in the third mode, if both the first switching element SWa and the second switching element SWb are turned on, the power supply 190 can output a display driving voltage of a third level LV3. Accordingly, it is possible to reduce heat generation by supplying various display driving voltages.

The converter 910 can further include a third switching element SW1 and a fourth switching element SW2 disposed at an input terminal of the transformer 905 and connected in series to each other, a voltage detector 915 for detecting a display driving voltage outputted from the output terminal No-Ng of the transformer 905, and a switching controller 925 for controlling the third switching element SW1 or the fourth switching element SW2, based on a voltage detected by the voltage detector 915.

In addition, the voltage detector 915 can detect the voltage at both ends nm-Ng of the second resistor element R2, and the switching controller 925 can be configured to increase the voltage at the output terminal No-Ng of the transformer 905 as the voltage at both ends of the second resistor element R2 becomes lower.

Further, the voltage detector 915 can detect the voltage at both ends nm-Ng of the second resistor element R2, and the switching controller can be configured to decrease the voltage at the output terminal No-Ng of the transformer 905 as the voltage at both ends of the second resistor element R2 becomes higher.

For example, during a first mode operation, if the voltage detected by the voltage detector 915 is lower than a first reference voltage corresponding to the first mode, the switching controller 925 can control the third switching element SW1 or the fourth switching element SW2 for the voltage detected by the voltage detector 915 to reach the first reference voltage.

Specifically, during a first mode operation, if the voltage detected by the voltage detector 915 is lower than a first reference voltage corresponding to the first mode, the switching controller 925 can be configured to increase the turn-on duty of the third switching element SW1 or the fourth switching element SW2. Accordingly, a display driving voltage corresponding to the first mode can be supplied.

As another example, during a first mode operation, if the voltage detected by the voltage detector 915 is higher than a first reference voltage corresponding to the first mode, the switching controller 925 can control the third switching element SW1 or the fourth switching element SW2 for the voltage detected by the voltage detector 915 to reach the first reference voltage.

Specifically, during a first mode operation, if the voltage detected by the voltage detector 915 is higher than a first reference voltage corresponding to the first mode, the switching controller 925 can be configured to decrease the turn-on duty of the third switching element SW1 or the fourth switching element SW2. Accordingly, a display driving voltage corresponding to the first mode can be supplied.

In addition, if the voltage detected by the voltage detector 915 is lower than a second reference voltage corresponding to the second mode, the switching controller 925 can control the third switching element SW1 or the fourth switching element SW2 for the voltage detected by the voltage detector 915 to reach the second reference voltage. Accordingly, a display driving voltage corresponding to the second mode can be supplied.

For example, during a second mode operation, if the voltage detected by the voltage detector 915 is lower than a second reference voltage corresponding to the second mode, the switching controller 925 can control the third switching element SW1 or the fourth switching element SW2 for the voltage detected by the voltage detector 915 to reach the second reference voltage.

Specifically, during a second mode operation, if the voltage detected by the voltage detector 915 is lower than a second reference voltage corresponding to the second mode, the switching controller 925 can be configured to increase the turn-on duty of the third switching element SW1 or the fourth switching element SW2. Accordingly, a display driving voltage corresponding to the second mode can be supplied.

As another example, during a second mode operation, if the voltage detected by the voltage detector 915 is higher than a second reference voltage corresponding to the second mode, the switching controller 925 can control the third switching element SW1 or the fourth switching element SW2 for the voltage detected by the voltage detector 915 to reach the second reference voltage.

Specifically, during a second mode operation, if the voltage detected by the voltage detector 915 is higher than a second reference voltage corresponding to the second mode, the switching controller 925 can be configured to decrease the turn-on duty of the third switching element SW1 or the fourth switching element SW2. Accordingly, a display driving voltage corresponding to the second mode can be supplied.

Also, if the voltage detected by the voltage detector 915 is lower than a third reference voltage corresponding to the third mode, the switching controller 925 can control the third switching element SW1 or the fourth switching element SW2 for the voltage detected by the voltage detector 915 to reach the third reference voltage. Accordingly, a display driving voltage corresponding to the third mode can be supplied.

For example, during a third mode operation, if the voltage detected by the voltage detector 915 is lower than a third reference voltage corresponding to the third mode, the switching controller 925 can control the third switching element SW1 or the fourth switching element SW2 for the voltage detected by the voltage detector 915 to reach the third reference voltage.

Specifically, during a third mode operation, if the voltage detected by the voltage detector 915 is lower than a third reference voltage corresponding to the third mode, the switching controller 925 can be configured to increase the turn-on duty of the third switching element SW1 or the fourth switching element SW2. Accordingly, a display driving voltage corresponding to the third mode can be supplied.

As another example, during a third mode operation, if the voltage detected by the voltage detector 915 is higher than a third reference voltage corresponding to the third mode, the switching controller 925 can control the third switching element SW1 or the fourth switching element SW2 for the voltage detected by the voltage detector 915 to reach the third reference voltage.

Specifically, during a third mode operation, if the voltage detected by the voltage detector 915 is higher than a third reference voltage corresponding to the third mode, the switching controller 925 can be configured to de crease the turn-on duty of the third switching element SW1 or the fourth switching element SW2. Accordingly, a display driving voltage corresponding to the third mode can be supplied.

Further, the power supply 190 can further include a resonance capacitor Cr and a resonance inductor Lr each connected between the input terminal of the transformer 905 and the fourth switching element SW2. Accordingly, various display driving voltages can be supplied by using resonance.

In addition, the voltage detector 915 can include a regulator SRa electrically connected to one end of the second resistor element R2 and a photo coupler PTD electrically connected to the regulator SRa, for transmitting the voltage between both ends of the second resistor element R2 to the switching controller 925. Accordingly, it is possible to reduce heat generation by supplying various display driving voltages based on feedback of the voltage between both ends of the second resistor element R2.

Consequently, the power supply 190 of FIG. 9 can output either a display driving voltage of a first level LV1, a display driving voltage of a second level LV2, or a display driving voltage of a third level LV3, through the multi-level voltage output circuit 935 serving as an LLC-based resonant dc/dc converter.

In particular, in the HDR mode, the power supply can output a display driving voltage of a third level LV3 higher than a second level, thereby helping to reduce heat generation and decreasing the chance of burn-out in circuit elements of the power supply 190.

Figure 10A:
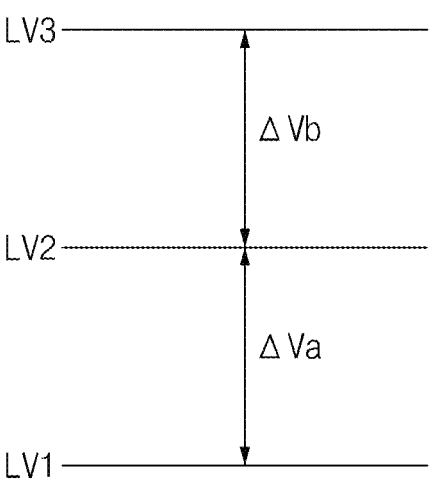
FIGS. 10A to 10E are diagrams referred to in the description of FIG. 9.
Figure 10B:
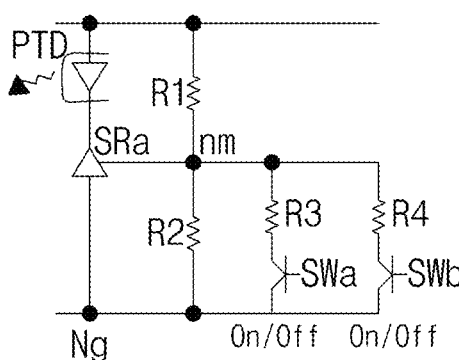
Figure 10C:
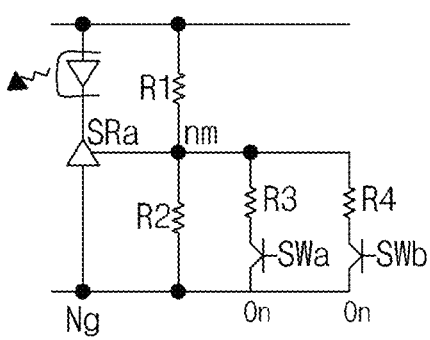
Figure 10D:
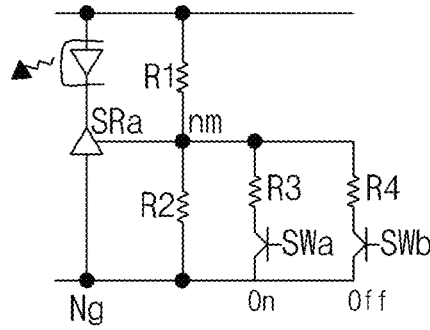
Figure 10E:
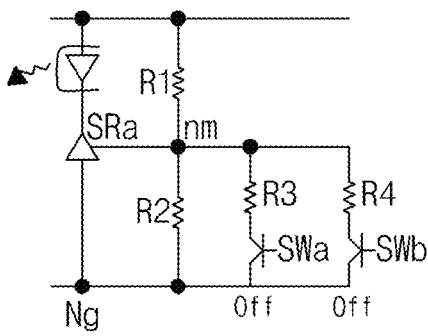

Next, FIGS. 10A and 10E are diagrams referred to in the description of FIG. 9. In particular, FIG. 10A is a diagram showing first to third levels of a display driving voltage.

Referring to FIG. 10A, the power supply 190 can output either a display driving voltage of a first level LV1, a display driving voltage of a second level LV2, or a display driving voltage of a third level LV3.

Further, it is preferable that the difference Vb between the third level LV3 and the second level LV2 is greater than the difference Va between the second level LV2 and the first level LV1. For example, the display driving voltage of the first level LV1 can be approximately 21 V, the display driving voltage of the second level LV2 can be approximately 23 V, and the display driving voltage of the third level LV3 can be approximately 25.5 V or approximately 26 V.

Accordingly, it is possible to supply various display driving voltages in various modes. In particular, in the HDR mode, a display driving voltage suitable for the display 180 can be outputted. Consequently, it is possible to reduce heat generation by supplying various display driving voltages in various modes. Furthermore, it is possible to stably display images in various modes.

Next, FIG. 10B is a diagram showing the multi-level voltage output circuit 935 of FIG. 9. Referring to FIG. 10B, the multi-level voltage output circuit 935 includes a first resistor element R1 and a second resistor element R2 disposed at the output terminal No-Ng of the transformer 905 and connected in series to each other, a third resistor element R3 and a first switching element SWa disposed at a first leg connected in parallel to both ends of the second resistor element R2, and connected in series to each other, and a fourth resistor element R4 and a second switching element SWb disposed at a second leg connected in parallel to both ends of the second resistor element R2, and connected in series to each other.

Further, the voltage detector 915 can include a regulator SRa electrically connected to one end of the second resistor element R2 and a photo coupler PTD electrically connected to the regulator SRa, for transmitting the voltage between both ends of the second resistor element R2 to the switching controller 925.

Also, as shown in FIG. 10B, the photo coupler PTD can be disposed between one end No of the first resistor element R1 and the regulator SRa. Also, the voltage detector 915 can transmit a detected current or a detected voltage to the switching controller 925, based on the conduction of the photo coupler PTD.

Next, FIGS. 10C to 10E are diagrams exemplifying an operation of the multi-level voltage output circuit 935 in the first to third modes. In particular, FIG. 10C exemplifies the third mode in which both of the first switching element SWa and the second switching element Swb are turned on.

Also, FIG. 10D exemplifies the second mode in which one of the first switching element SWa and the second switching element Swb is turned on. FIG. 10E exemplifies the first mode in which both the first switching element SWa and the second switching element Swb are turned off.

A description will be given on the assumption that the first to fourth resistor elements have a resistance value of 2 kΩ. In the first mode, both the first switching element SWa and the second switching element SWb are turned off, and therefore the total resistance is approximately 4 kΩ because of the first resistor element and the second resistor element.

In the second mode, one of the first switching element SWa and the second switching element SWb is turned on, and therefore the resistance at both ends of the second resistor element is 1 kΩ, and the total resistance is approximately 3 kΩ in consideration of the first resistor element.

In the third mode, both the first switching element SWa and the second switching element SWb are turned on, and therefore the resistance at both ends of the second resistor element is 0.67 kΩ, and the total resistance is approximately 2.67 kΩ in consideration of the first resistor element.

Consequently, the total resistance is highest in the first mode, and the total resistance is lowest in the third mode. In this way, either a display driving voltage of a first level LV1, a display driving voltage of a second level LV2, or a display driving voltage of a third level LV3 is outputted by using the differences in the total resistance of the multi-level voltage output circuit 935 among the first and third modes. Accordingly, it is possible to reduce heat generation by supplying various display driving voltages in various modes. Furthermore, it is possible to stably display images in various modes.

Figure 11:
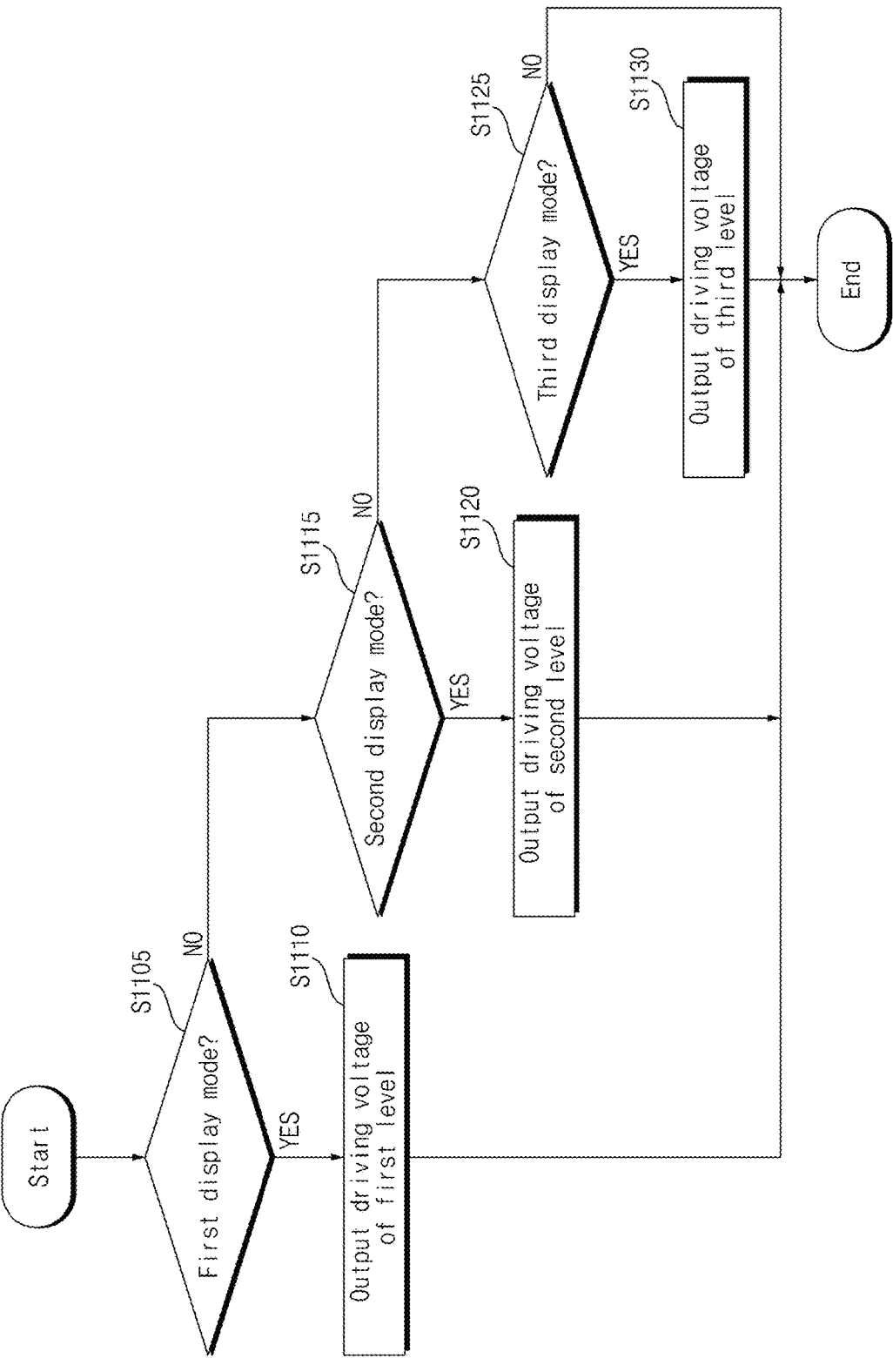
FIG. 11 is a sequential chart showing a method of operating an image display apparatus according to an embodiment of the present disclosure.

Next, FIG. 11 is a sequential chart showing a method of operating an image display apparatus according to an embodiment of the present disclosure. Referring to FIG. 11, the signal processing device 170 of the image display apparatus 100 can output a display driving voltage for a selected mode among the first to third modes displayed in a settings screen.

In more detail, the signal processing device 170 of the image display apparatus 100 determines whether the first mode is set (S1105), and if so (Yes in S1105), the power supply 190 is configured to output a display driving voltage of a first level LV1 (S1110). If the first mode is not set (No in S1105), the signal processing device 170 of the image display apparatus 100 determines whether the second mode is set (S1115), and if so (Yes in S115), the power supply 190 is configured to output a display driving voltage of a second level LV2 (S1120).

Also, if the second mode is not set (No in S1115), the signal processing device 170 of the image display apparatus 100 determines whether the third mode is set (S1125), and if so (Yes in S125), the power supply 190 is configured to output a display driving voltage of a third level LV3 (S1130).

Also, the first mode can be a first display mode or a first brightness mode. Accordingly, it is possible to reduce heat generation by supplying various display driving voltages.

Figure 12A:
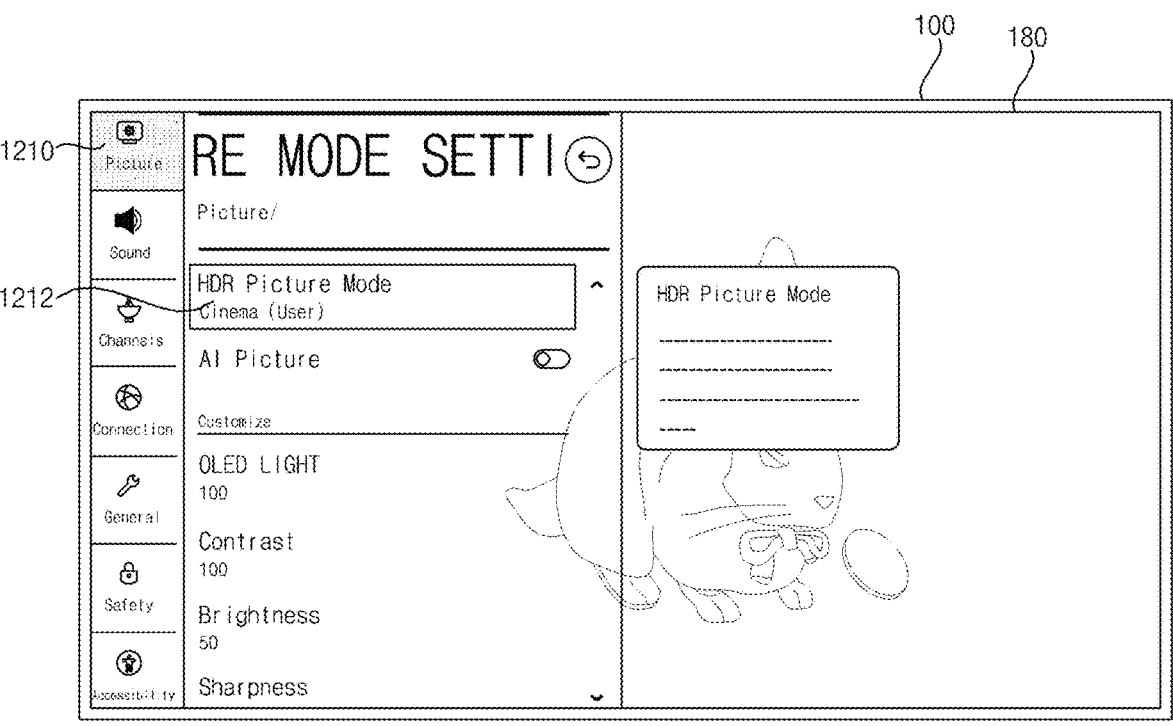
FIGS. 12A to 12C are diagrams referred to in the description of FIG. 11.
Figure 12B:
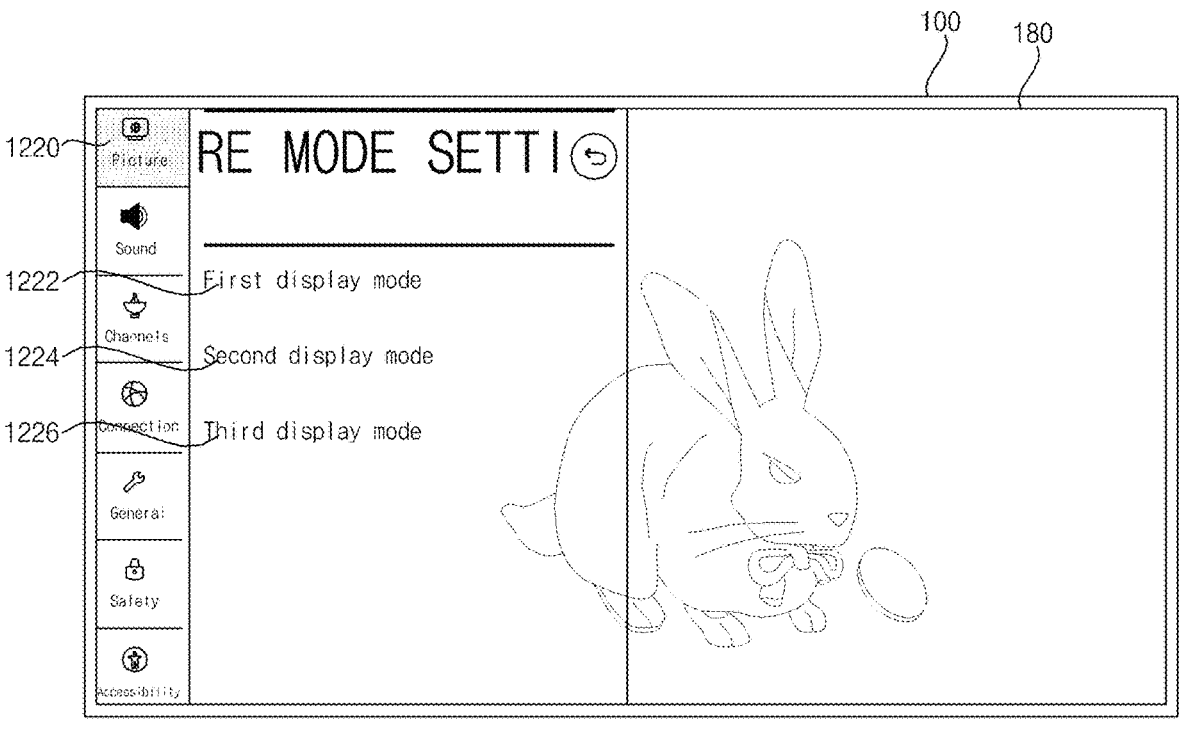
Figure 12C:
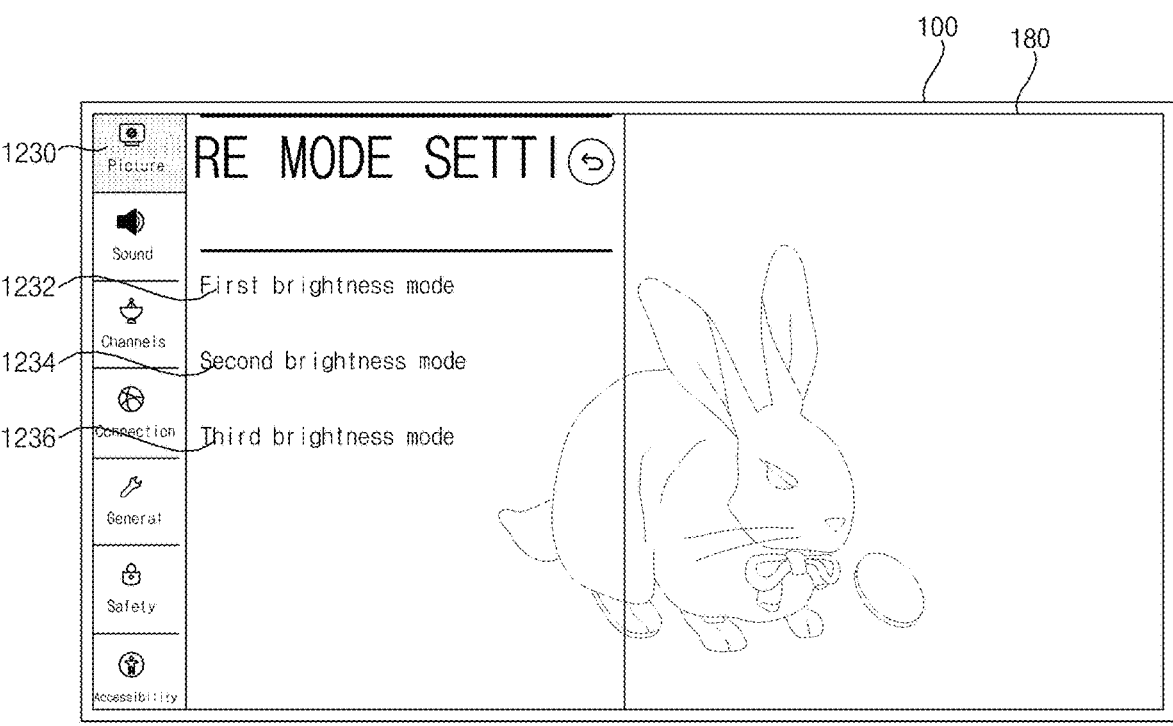

Next, FIGS. 12A to 12C are diagrams referred to in the description of FIG. 11. In particular, FIG. 12A illustrates that a high dynamic range mode item 1212 is selected as an image output mode in a settings screen 1210 shown on the display 1800.

If the high dynamic range mode item 1212 is selected based on the remote control signal, the signal processing device 170 performs the HDR mode as the image output mode. For example, the signal processing device 170 can send a third mode selection signal to the power supply 190.

Further, if the image output mode of the signal processing device 170 is the HDR mode, the power supply 190 can receive a third mode selection signal from the signal processing device 170 and output a display driving voltage of a third level LV3 based on the third mode selection signal. Accordingly, it is possible to supply a display driving voltage corresponding to the HDR mode, and, as a result, to reduce heat generation.

Next, FIG. 12B illustrates that a first display mode item 1222, a second display mode item 1224, and a third display mode item 1226 are displayed in the settings screen 1220 shown on the display 1800. The first display mode can correspond to display power control (DPC)-on mode, the second display mode can correspond to display power control (DPC)-off mode, and the third display mode can correspond to peak-on mode.

In addition, if the first display mode item 1222 corresponding to display power control-on mode is selected in the settings screen 1220, the signal processing device 170 can control the power supply 190 to supply the display driving voltage of the first level LV1 to the display 180 based on the first mode.

If the first display mode item 1224 corresponding to display power control-off mode is selected in the settings screen 1220, the signal processing device 170 can control the power supply 190 to supply the display driving voltage of the second level LV2 to the display 180 based on the second mode.

Also, if the third display mode item 1226 corresponding to peak-on mode is selected in the settings screen 1220, the signal processing device 170 can control the power supply 190 to supply the display driving voltage of the third level LV3 to the display 180 based on the third mode.

Next, FIG. 12C illustrates that a first brightness mode item 1232, a second brightness mode item 1234, and a third brightness mode item 1236 are displayed in the settings screen 1230 shown on the display 1800. The first brightness mode can correspond to Eco mode or Standard mode which is an image output mode, the second brightness mode can correspond to Cinema mode or Game mode which is an image output mode, and the third brightness mode can correspond to HDR mode which is an image output mode.

Also, if the first brightness mode item 1232 corresponding to Eco mode or Standard mode is selected in the settings screen 1230, the signal processing device 170 can control the power supply 190 to supply the display driving voltage of the first level LV1 to the display 180 based on the first mode.

In addition, if the first brightness mode item 1234 corresponding to Cinema mode or Game mode is selected in the settings screen 1230, the signal processing device 170 can control the power supply 190 to supply a display driving voltage of a second level LV2 to the display 180 based on a second mode.

If the third brightness mode item 1236 corresponding to the HDR mode is selected in the settings screen 1230, the signal processing device 170 can control the power supply 190 to supply a display driving voltage of a third level LV3 to the display 180 based on a third mode.

Further, the power supply 190 according to an embodiment of the present disclosure varies the level of the display driving voltage based on the image output mode of the signal processing device 170. In particular, the power supply 190 outputs a higher-level display driving voltage in Cinema mode or Game mode than when the image output mode of the signal processing device 170 is Eco mode, and outputs a higher-level display driving voltage in HDR mode than when the image output mode of the signal processing device 170 is Cinema mode or Game mode. Accordingly, it is possible to reduce heat generation by supplying various display driving voltages in various modes. Furthermore, it is possible to stably display images in various modes.

As described above, an image display apparatus according to an embodiment of the present disclosure includes a display, a signal processing device to output an image signal to the display, and a power supply to supply a display driving voltage to the display, wherein the power supply outputs a display driving voltage of a first level based on a first mode, outputs a display driving voltage of a second level higher than the first level based on a second mode, and outputs a display driving voltage of a third level higher than the second level based on a third mode. Accordingly, it is possible to reduce heat generation by supplying various display driving voltages in various modes. Furthermore, it is possible to stably display images in various modes.

Further, the power supply can include a converter to convert an input voltage to output a DC voltage, wherein the converter includes a transformer; and a multi-level voltage output circuit connected to an output terminal of the transformer, and configured to output one of the display driving voltages of the first to third levels based on one of the first to third modes. Accordingly, it is possible to reduce heat generation by supplying various display driving voltages in various modes. Furthermore, it is possible to stably display images in various modes.

Also, the multi-level voltage output circuit can include a first resistor element and a second resistor element disposed at the output terminal of the transformer and connected in series to each other; a third resistor element and a first switching element disposed at a first leg connected in parallel to both ends of the second resistor element, and connected in series to each other; and a fourth resistor element and a second switching element disposed at a second leg connected in parallel to both ends of the second resistor element, and connected in series to each other. Accordingly, it is possible to reduce heat generation by supplying various display driving voltages.

Further, one of the display driving voltages of the first to third levels can be outputted, based on the turn-on or turn-off of the first switching element or the second switching element. Accordingly, it is possible to reduce heat generation by supplying various display driving voltages.

The converter can further include a third switching element and a fourth switching element disposed at an input terminal of the transformer and connected in series to each other; a voltage detector to detect a display driving voltage outputted from the output terminal of the transformer; and a switching controller to control the third switching element or the first switching element, based on a voltage detected by the voltage detector. Accordingly, it is possible to reduce heat generation by supplying various display driving voltages.

Further, the voltage detector can detect the voltage at both ends of the second resistor element, and the switching controller can be configured to increase the voltage at the output terminal of the transformer as the voltage at both ends of the second resistor element becomes lower. Accordingly, it is possible to reduce heat generation by supplying various display driving voltages.

The power supply can further include a resonance capacitor and a resonance inductor each connected between the input terminal of the transformer and the fourth switching element. Accordingly, it is possible to supply various display driving voltages by using resonance.

Also, the voltage detector can include a regulator electrically connected to one end of the second resistor element; and a photo coupler electrically connected to the regulator, for transmitting the voltage between both ends of the second resistor element to the switching controller. Accordingly, it is possible to reduce heat generation by supplying various display driving voltages, based on feedback of the voltage between both ends of the second resistor element.

Further, in response to the voltage detected by the voltage detector being lower than a first reference voltage corresponding to the first mode, the switching controller can control the third switching element or the fourth switching element for the voltage detected by the voltage detector to reach the first reference voltage. Accordingly, it is possible to supply a display driving voltage corresponding to the first mode.

Further, in response to the voltage detected by the voltage detector being lower than a second reference voltage corresponding to the second mode, the switching controller can control the third switching element or the fourth switching element for the voltage detected by the voltage detector to reach the second reference voltage. Accordingly, it is possible to supply a display driving voltage corresponding to the second mode.

Further, in response to the voltage detected by the voltage detector being lower than a third reference voltage corresponding to the third mode, the switching controller can control the third switching element or the fourth switching element for the voltage detected by the voltage detector to reach the third reference voltage. Accordingly, it is possible to supply a display driving voltage corresponding to the third mode.

Further, both the first switching element and the second switching element can be turned off in the first mode, one of the first switching element and the second switching element can be turned on in the second mode, and both the first switching element and the second switching element can be turned on in the third mode. Accordingly, it is possible to reduce heat generation by supplying various display driving voltages.

Further, the signal processing device can be configured to output a display driving voltage for a selected mode among the first to third modes displayed in a settings screen. Accordingly, it is possible to reduce heat generation by supplying various display driving voltages.

Further, in response to display power control-on mode being selected in the settings screen, the signal processing device can be configured to control the power supply to supply the display driving voltage of the first level to the display based on the first mode, and in response to display power control-off mode being selected in the settings screen, the signal processing device can be configured to control the power supply to supply the display driving voltage of the second level to the display based on the second mode. Accordingly, it is possible to reduce heat generation by supplying various display driving voltages in various modes. Furthermore, it is possible to stably display images in various modes.

Further, in response to peak-on mode being selected in the settings screen, the signal processing device can be configured to control the power supply to supply the display driving voltage of the third level to the display based on the third mode. Accordingly, it is possible to supply a display driving voltage corresponding to peak-on mode, and as a result, to reduce heat generation.

Further, in response to the image output mode of the signal processing device being Eco mode or Standard mode, the power supply can output the display driving voltage of the first level, and in response to the image output mode of the signal processing device being Cinema mode or Game mode, the power supply can output the display driving voltage of the second level. Accordingly, it is possible to reduce heat generation by supplying various display driving voltages in various modes. Furthermore, it is possible to stably display images in various modes.

Further, in response to the image output mode of the signal processing device being HDR mode, the power supply can output the display driving voltage of the third level. Accordingly, it is possible to reduce heat generation by supplying various display driving voltages in various modes. Furthermore, it is possible to stably display images in various modes.

Further, the difference between the third level and the second level can be greater than the difference between the second level and the first level. Accordingly, it is possible to reduce heat generation by supplying various display driving voltages in various modes. Furthermore, it is possible to stably display images in various modes.

An image display apparatus according to another embodiment of the present disclosure comprises a display; a signal processing device to output an image signal to the display; and a power supply to supply a display driving voltage to the display, wherein the power supply changes the display driving voltage, based on an image output mode of the signal processing device, outputs a higher-level display driving voltage in Cinema mode or Game mode than in response to the image output mode of the signal processing device being Eco mode, and outputs a higher-level display driving voltage in Cinema mode or Game mode than in response to the image output mode of the signal processing device being HDR mode. Accordingly, it is possible to reduce heat generation by supplying various display driving voltages in various modes. Furthermore, it is possible to stably display images in various modes.

Further, the power supply can include a transformer; a first resistor element and a second resistor element disposed at the output terminal of the transformer and connected in series to each other; a third resistor element and a first switching element disposed at a first leg connected in parallel to both ends of the second resistor element, and connected in series to each other; and a fourth resistor element and a second switching element disposed at a second leg connected in parallel to both ends of the second resistor element, and connected in series to each other, wherein one of the display driving voltages of the first to third levels is output, based on the turn-on or turn-off of the first switching element or the second switching element. Accordingly, it is possible to reduce heat generation by supplying various display driving voltages in various modes. Furthermore, it is possible to stably display images in various modes.

In addition, the power supply can further include a third switching element and a fourth switching element disposed at an input terminal of the transformer and connected in series to each other; a voltage detector to detect a display driving voltage outputted from the output terminal of the transformer; and a switching controller to control the third switching element or the first switching element, based on a voltage detected by the voltage detector. Accordingly, it is possible to reduce heat generation by supplying various display driving voltages in various modes.

While the disclosure has been described with reference to the embodiments, the disclosure is not limited to the above-described specific embodiments, and it will be understood by those skilled in the related art that various modifications and variations may be made without departing from the scope of the disclosure as defined by the appended claims, as well as these modifications and variations should not be understood separately from the technical spirit and prospect of the disclosure.

What is claimed is:
1. An image display apparatus comprising:
a display;
a signal processing device to output an image signal to the display; and
a power supply to:
in response to a first image output mode of the signal processing device, output a display driving voltage of a first level,
in response to a second image output mode of the signal processing device, output a display driving voltage of a second level higher than the first level based on a second mode, and
in response to a third image output mode of the signal processing device, output a display driving voltage of a third level higher than the second level based on a third mode,
wherein the power supply includes a converter to convert an input voltage to output a DC voltage, and
wherein the converter includes:
a transformer; and

26 a multi-level voltage output circuit connected to an output terminal of the transformer, and configured to output one of the display driving voltages of the first to third levels based on one of the first to third image output modes,
a first switching element and a second switching element disposed at an input terminal of the transformer and connected in series to each other;
a voltage detector to detect a display driving voltage output from the output terminal of the transformer; and
a switching controller to control the first switching element or the second switching element, based on a voltage detected by the voltage detector; and
a resonance capacitor and a resonance inductor each connected between the input terminal of the transformer and the second switching element.
2. The image display apparatus of claim 1, wherein the multi-level voltage output circuit includes:
a first resistor element and a second resistor element disposed at the output terminal of the transformer and connected in series to each other;
a third resistor element and a third switching element disposed at a first leg connected in parallel to both ends of the second resistor element, and connected in series to each other; and
a fourth resistor element and a fourth switching element disposed at a second leg connected in parallel to both ends of the second resistor element, and connected in series to each other, and
wherein one of the display driving voltages of the first to third levels is output, based on the turn-on or turn-off of the third switching element or the fourth switching element.
3. The image display apparatus of claim 2, wherein the voltage detector detects the voltage at both ends of the second resistor element, and the switching controller is configured to increase the voltage at the output terminal of the transformer as the voltage at both ends of the second resistor element becomes lower.
4. The image display apparatus of claim 3, wherein the voltage detector includes:
a regulator electrically connected to one end of the second resistor element; and
a photo coupler electrically connected to the regulator, for transmitting the voltage between both ends of the second resistor element to the switching controller.
5. The image display apparatus of claim 1, wherein, in response to the voltage detected by the voltage detector being lower than a first reference voltage corresponding to the first image output mode, the switching controller controls the first switching element or the second switching element for the voltage detected by the voltage detector to reach the first reference voltage.
6. The image display apparatus of claim 1, wherein, in response to the voltage detected by the voltage detector being lower than a second reference voltage corresponding to the second image output mode, the switching controller controls the first switching element or the second switching element for the voltage detected by the voltage detector to reach the second reference voltage.
7. The image display apparatus of claim 1, wherein, in response to the voltage detected by the voltage detector being lower than a third reference voltage corresponding to the third image output mode, the switching controller controls the first switching element or the second switching element for the voltage detected by the voltage detector to reach the third reference voltage.

8. The image display apparatus of claim 2, wherein both the third switching element and the fourth switching element are turned off in the first image output mode, one of the third switching element and the fourth switching element is turned on in the second image output mode, and both the third switching element and the fourth switching element are turned on in the third image output mode.

9. The image display apparatus of claim 1, wherein the display is configured to display a setting screen including a first mode option corresponding to the first image output mode, a second mode option corresponding to the second image output mode, and a third mode option corresponding to the third image output mode, and wherein the signal processing device is configured to output a display driving voltage for a selected mode among the first to third mode options displayed in the settings screen.

10. The image display apparatus of claim 9, wherein the settings screen further includes a power control-on mode option corresponding to the first image output mode that when selected causes the signal processing device to control the power supply to supply the display driving voltage of the first level to the display based on the first image output mode, and wherein the settings screen further includes a control-off mode option corresponding to the second image output mode that when selected causes the signal processing device to control the power supply to supply the display driving voltage of the second level to the display based on the second image output mode.

11. The image display apparatus of claim 9, wherein the settings screen further includes a peak-on mode option corresponding to the third image output mode that when selected, causes the signal processing device to control the power supply to supply the display driving voltage of the third level to the display based on the third image output mode.

12. The image display apparatus of claim 1, wherein, in response to the image output mode of the signal processing device being an Eco mode or a Standard mode corresponding to the first image output mode, the power supply outputs the display driving voltage of the first level, and in response to the image output mode of the signal processing device being a Cinema mode or a Game mode corresponding to the second image output mode, the power supply outputs the display driving voltage of the second level.

13. The image display apparatus of claim 1, wherein, in response to the image output mode of the signal processing device being a High Dynamic Range mode corresponding to the third image output mode, the power supply outputs the display driving voltage of the third level.

14. The image display apparatus of claim 1, wherein the difference between the third level and the second level is greater than the difference between the second level and the first level.

15. An image display apparatus comprising:

a display;

28 a signal processing device to output an image signal to the display; and a power supply to supply a display driving voltage to the display, wherein the power supply changes the display driving voltage, based on an image output mode of the signal processing device, outputs a higher-level display driving voltage in a Cinema mode or a Game mode corresponding to a second image output mode of the signal processing device than in response to the image output mode of the signal processing device being an Eco mode corresponding to a first image output mode corresponding to a second image output mode of the signal processing device, and outputs a higher-level display driving voltage in the Cinema mode or the Game mode than in response to the image output mode of the signal processing device being a High Dynamic Range mode corresponding to a first image output mode corresponding to a third image output mode of the signal processing device, wherein the power supply includes a converter to convert an input voltage to output a DC voltage, and wherein the converter includes:

a transformer; and a multi-level voltage output circuit connected to an output terminal of the transformer, and configured to output one of the display driving voltages of first to third levels based on one of the first to third image output modes, a first switching element and a second switching element disposed at an input terminal of the transformer and connected in series to each other;

a voltage detector to detect a display driving voltage output from the output terminal of the transformer; and a switching controller to control the first switching element or the second switching element, based on a voltage detected by the voltage detector; and a resonance capacitor and a resonance inductor each connected between the input terminal of the transformer and the second switching element.

16. The image display apparatus of claim 15, wherein the power supply includes:

a transformer;

a first resistor element and a second resistor element disposed at the output terminal of the transformer and connected in series to each other;

a third resistor element and a third switching element disposed at a first leg connected in parallel to both ends of the second resistor element, and connected in series to each other; and a fourth resistor element and a fourth switching element disposed at a second leg connected in parallel to both ends of the second resistor element, and connected in series to each other, and wherein one of the display driving voltages of the first to third levels is outputted, based on the turn-on or turn-off of the third switching element or the fourth switching element.

* * * * *